(12) United States Patent
Gao et al.

(10) Patent No.: US 12,050,609 B1
(45) Date of Patent: Jul. 30, 2024

(54) DISCRETIZATION OF CONTINUOUS STREAM OF DATA ITEMS USING DATA DIVIDERS

(71) Applicant: Amazon Technologies, Inc., Seattle, WA (US)

(72) Inventors: Jie Gao, Coquitlam (CA); Fernando Previtalli Spanghero, Vancouver (CA); Yang Tan, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 17/849,567

(22) Filed: Jun. 24, 2022

(51) Int. Cl.
*H04L 12/00* (2006.01)
*G06F 16/23* (2019.01)
*G06F 16/2455* (2019.01)
*G06F 16/2457* (2019.01)
*H04L 43/026* (2022.01)

(52) U.S. Cl.
CPC .... *G06F 16/24568* (2019.01); *G06F 16/2365* (2019.01); *G06F 16/24578* (2019.01); *H04L 43/026* (2013.01)

(58) Field of Classification Search
CPC ........... G06F 16/24568; G06F 16/2365; G06F 16/24578; G06F 16/258; G06F 21/6236; G06F 16/185; H04L 43/026
USPC .................................. 709/219, 234; 707/600
See application file for complete search history.

(56) References Cited

U.S. PATENT DOCUMENTS

| | | | |
|---|---|---|---|
| 9,456,014 B2 * | 9/2016 | Luo .................. | G06F 16/24568 |
| 10,936,585 B1 * | 3/2021 | Echeverria ............... | G06N 5/00 |
| 10,936,617 B1 * | 3/2021 | Searls ................... | G06F 16/258 |
| 11,269,939 B1 * | 3/2022 | Sammer ................. | H04L 67/55 |
| 11,720,537 B2 * | 8/2023 | Anwar .................. | G06F 16/254 |
| | | | 707/715 |
| 2015/0370882 A1 * | 12/2015 | Kalki .................. | G06F 21/6236 |
| | | | 707/600 |
| 2015/0370883 A1 * | 12/2015 | Kalki .................... | G06F 16/185 |
| | | | 707/600 |
| 2016/0182588 A1 * | 6/2016 | Luo .................... | G06F 16/24568 |
| | | | 709/219 |

* cited by examiner

*Primary Examiner* — Frantz Coby
(74) *Attorney, Agent, or Firm* — Lee & Hayes P.C.

(57) ABSTRACT

Data dividers with partition identifiers are described for use in data analytics for streaming data. A continuous flow of data items received by a network-based data analytics service may be discretized into data buckets based on a time window associated with each of the data buckets receiving the data items from the data stream Data dividers may be generated based on a number of partitions determined to be necessary to implement parallel processing of the data items and each partition may include the data items to be processed as well as a single data divider ordered at the end of the partition such that the data divider is the last item to be processed. In this way, the network-based data analytics service may determine that all of the data items for a given data bucket have been processed once all of the data dividers have been processed.

20 Claims, 14 Drawing Sheets

300(2)

{"idempotenceId":
"cmpny1.abc.booking.0369869lkhlkhoi
0909ujliuttll-234234sdf-2343",
"idempotenceVersion": 1,
"logicalPartition": 2, } PARTITION IDENTIFIER 306(2)
**"folioSequenceID": "time_interval://
2024-01-24T16:45:00Z/2024-01-
24T16:50:00Z",** } TIME WINDOW DATA 304(2)
"s3Location": "s3://xyz-example/
cmpny1.abc.booking.0369869lkhlkhoi0
909ujliuttll-234234sdf-2343/payload",
"sourceSystemId": "XYZ",
"updatedTimeInSecSinceEpoch":
1706136311,
"business_activity":
"payment_fee_tax_computation",
"financial_component":
"balance_payable",
"business_namespace":
"company1_payment_services",
"business_country_code": "XY",
"financial_component_group":
"payment_fee_tax_computation",
"abc_merchant_id":
"cmpny1.abc.merchant.129256"}

FIG. 3B

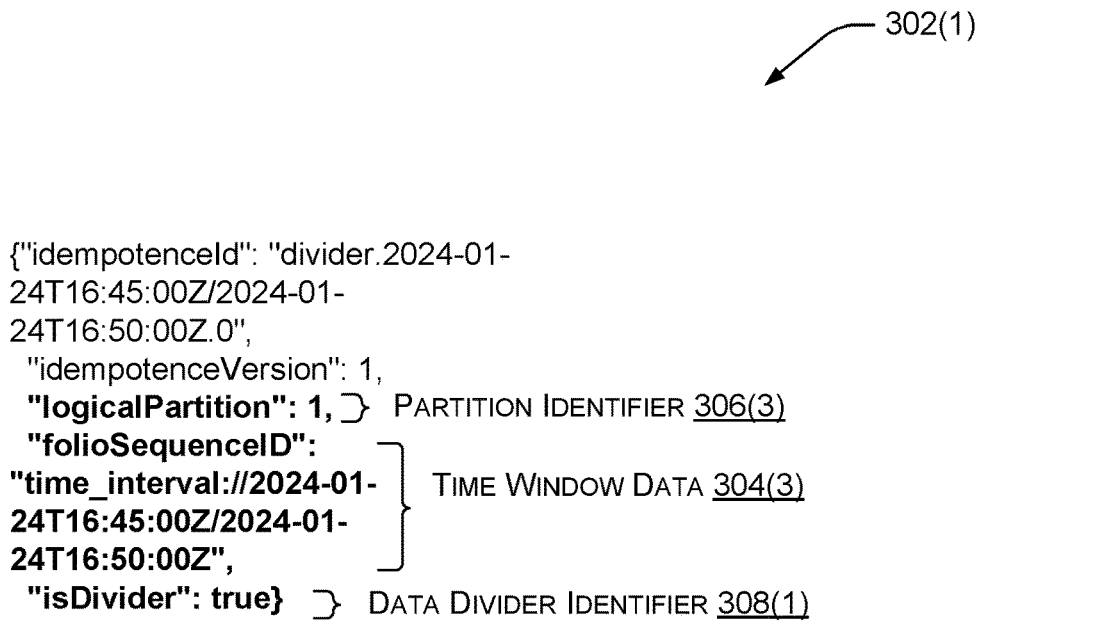

```
{"idempotenceId": "divider.2024-01-
24T16:45:00Z/2024-01-
24T16:50:00Z.0",
  "idempotenceVersion": 1,
  "logicalPartition": 1,   } PARTITION IDENTIFIER 306(3)
  "folioSequenceID":
  "time_interval://2024-01-   } TIME WINDOW DATA 304(3)
  24T16:45:00Z/2024-01-
  24T16:50:00Z",
  "isDivider": true}   } DATA DIVIDER IDENTIFIER 308(1)
```

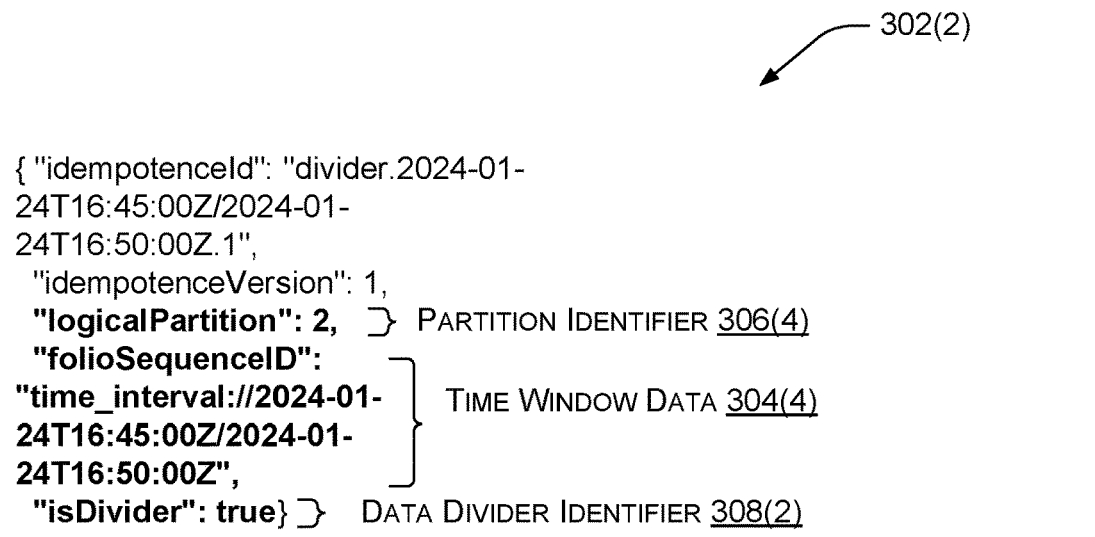

```
{ "idempotenceId": "divider.2024-01-
24T16:45:00Z/2024-01-
24T16:50:00Z.1",
  "idempotenceVersion": 1,
  "logicalPartition": 2,   } PARTITION IDENTIFIER 306(4)
  "folioSequenceID":
  "time_interval://2024-01-   } TIME WINDOW DATA 304(4)
  24T16:45:00Z/2024-01-
  24T16:50:00Z",
  "isDivider": true}   } DATA DIVIDER IDENTIFIER 308(2)
```

FIG. 3C

DISCRETIZATION OF CONTINUOUS STREAM OF DATA ITEMS USING DATA DIVIDERS

BACKGROUND

A network-based data analytics service performs real-time analytics on streaming data so that customers of the service are able to gain valuable insights into the data. Because a stream of incoming data flows continuously through a network-based analytics system, the data is unbounded by nature. Accordingly, there is often a need to discretize the continuous stream into bounded data buckets, so that deterministic collections of data items (e.g., transactions) can be generated for storage and processing efficiency, for repeatability (e.g., of re-processing), and for assertions of completeness.

In order to determine that all of the necessary data items received during a given time window have been processed into the data bucket, assumptions have to be made that when a particular data bucket key is no longer observed in the data stream, the corresponding data bucket can be deemed finalized. However, there is often an ambiguity when a data bucket key is not immediately being observed. For example, this may be due to a temporary lack of organic traffic on that data bucket key or a particular data item taking an above average time to be processed. A common way to disambiguate this issue is to have a buffer (e.g., a cool down time) introduced so that the data bucket is deemed to be finalized after not observing its data bucket key for a threshold period of time. However, this technique cannot completely eliminate the ambiguity, and, given that these thresholds are often determined based on best guesses to allow enough safe headroom, this technique often results in delays in finalization of data buckets, which results in an unnecessary delay in determining that a data bucket may be considered complete and the network-based data analytics service processing data items for a new data bucket.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3B is another diagram illustrating an example data item.

FIG. 3C is a diagram illustrating example data dividers.

DETAILED DESCRIPTION

Figure 1:
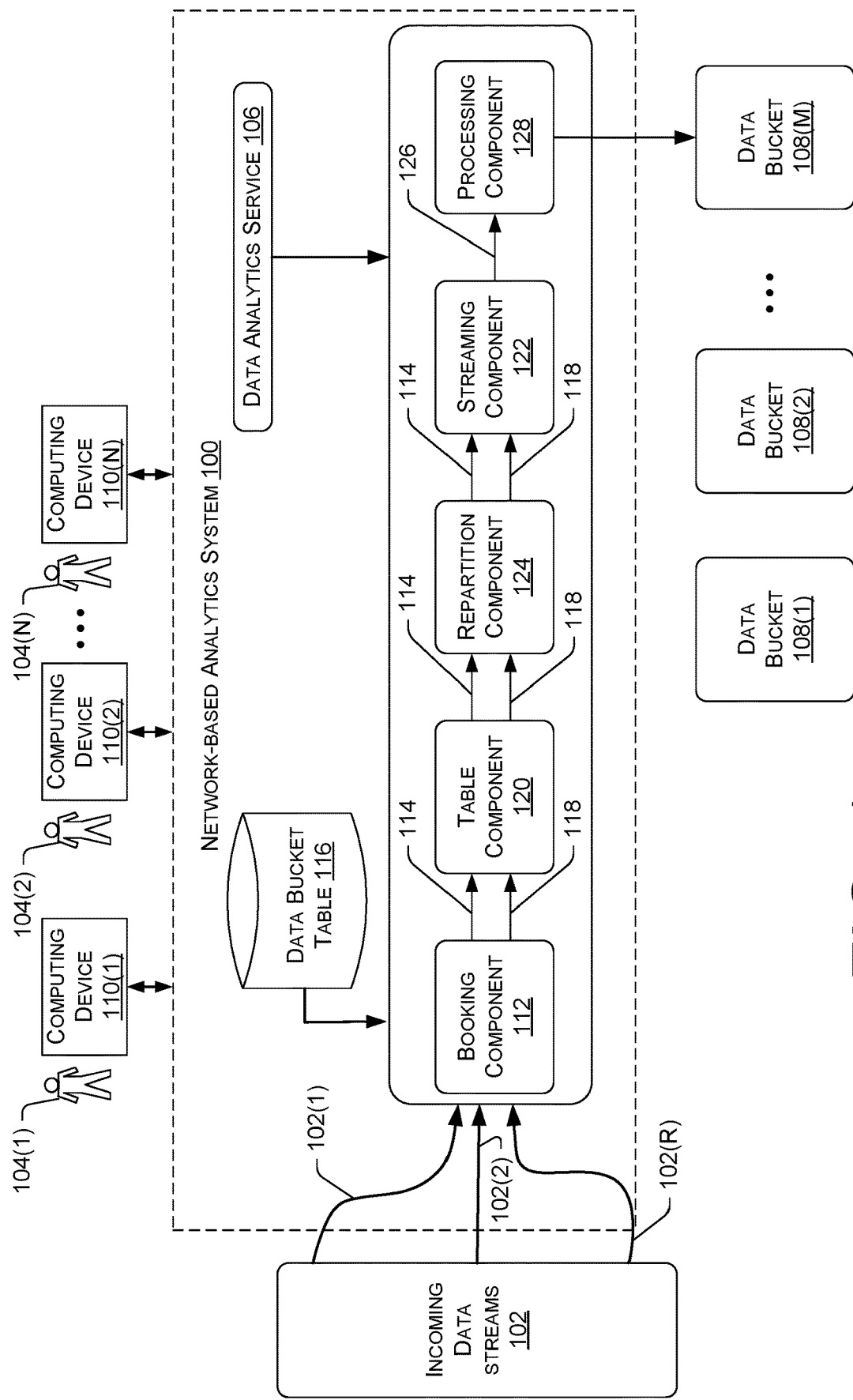
FIG. 1 is a software and network architecture diagram showing aspects of the operation of a network-based analytics system to process incoming data streams.

Described herein are, among other things, techniques, devices, and systems for implementing data dividers into a data stream and using the data dividers to determine that a given data bucket can be considered finalized (e.g., has received the correct number of data items being processed via the data stream). In particular, when a network-based data analytics service receives a new data item (e.g., a message from a client operating an application via the network-based data analytics service), the network-based data analytics service may determine a data bucket in which the data item will ultimately be stored on based on a data bucket time window associated with the data bucket when the data item was received. For example, a continuous flow of data items received by the network-based data analytics service may be discretized into data buckets based on a time window associated with each of the data buckets receiving the data items from the data stream. By way of example, in a given hour, the network-based data analytics service may process the data items received via the input data stream into sixty different data buckets based on one-minute time intervals. That is, every minute, the network-based data analytics service identifies the current data bucket that will receive the processed data items and tags, or otherwise associates, the incoming data items with that data bucket based on which time interval they are received in. In some cases, the incoming data items may be referred to as an incoming data stream and may be an unbounded and ordered collection of data where the time between one data item and subsequent item being available in the stream can be infinitely small. In some examples, a data bucket may include a bounded collection of data items that remains immutable after it is finalized and published. In some embodiments discussed herein, techniques are provided for dividing the incoming data items into the data buckets to form a total order.

In an example process, when a data item is received (e.g., via the incoming data stream), the network-based data analytics service may generate data dividers and insert the data dividers into a table (e.g., an audit log table) along with the received data item. The number of data dividers generated may depend on a number of partitions being used to process the data items. For example, the data dividers and the data items may ultimately be posted to a data stream to be processed into their respective data buckets. The data stream may include multiple shards made up of logical partitions used for parallel processing of the data items. Each logical partition may include the data items to be processed as well as a single data divider ordered at the end of the partition such that the data divider is the last item to be processed. In this way, the network-based data analytics service may determine that all of the data items for a given data bucket have been processed once all of the data dividers, which are at the end of each partition, have been processed. For example, if 50 data dividers were generated for 50 logical partitions when data items were received during particular time window, then the network-based data analytics service will determine that all of the data items arrived at the data bucket associated with the time window after all 50 data dividers were processed and the data bucket can be considered finalized and/or complete. Thus, this will result in minimal delay in data bucket rotations, which require that a data bucket be finalized, because there is no need to implement a time buffer (e.g., a cool down time) to deem a data bucket is finalized after not observing its data bucket key or tag for a threshold period of time.

Implementations of the techniques and systems described herein can improve the functioning of the systems with respect to conventional systems. In particular, the implementations described herein allow a network-based analytics system to output accurately-grouped finalized data buckets, as compared to conventional analytics systems for processing incoming data streams. This provides a better-performing data analytics system that mitigates the adverse impacts noted above, such as eliminating the need to introduce timing buffers at the end of a data buckets time window to ensure that the data bucket may be finalized. Resources, such as processing resources, may also be conserved by reducing, if not avoiding altogether, post processing operations (e.g., unnecessarily monitoring for additional data items for a data bucket after the time window has expired) that may otherwise have been performed in conventional system when there is late arriving data. Technical benefits other than those specifically mentioned herein can also be realized through an implementation of the disclosed technologies.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a network-based analytics system 100 (sometimes shortened to "system 100") to process incoming data streams 102(1), 102(2) . . . 102(R) (collectively 102) on behalf of customers 104(1), 104(2) . . . 104(N) (collectively 104), according to one particular configuration. The system 100 may represent a computing network, with various networked-computing systems and devices, configured to provide computing resources (sometimes referred to simply as "resources") on a permanent or an as-needed basis. For example, the system 100 may provide a data analytics service 106 for discretizing incoming data streams 102 into data buckets 108(1), 108(2) . . . 108(M) (collectively 108). It is to be appreciated that the network-based analytics system 100 may be part of a larger computing network/system that is configured to provide additional types of network-based services and/or provide additional types of computing resources. For example, the network-based analytics system 100 may be part of a system that also provides, without limitations, data processing resources, data storage resources, virtual machine ("VM") instances, networking resources, data communication resources, network services, and/or other types of computing resources and associated network-based services.

The network-based analytics system 100 can be accessed using an appropriate computing system, such as the computing devices 110(1), 110(2) . . . 110(N) (collectively 110), to communicate with the system 100 and/or the data analytics service 106 over an appropriate data communications network. In this way, a customer 104 of the data analytics service 106 can create, manage/update/change, use, and/or delete data (e.g., such as data running on applications associated with the customer 104) processed by the system 100 and the system 100 may receive the customer 104 input as the incoming data stream 102.

In a general example, and without limitation, a computing device 110 can be utilized by a customer 104 of the data analytics service 106 to purchase, rent, lease, etc., and use (e.g., create, manage/update/change, delete) computing resources, such as an application associated with the customer 104, and/or to configure aspects of the operation of the computing resources, and/or to access and utilize functionality provided by the various services, tools, environments, and systems described herein, and/or to perform other types of functionality with regard to the operation of the computing resources provided by the network-based analytics system 100.

The computing devices utilized to configure and monitor the resources in the system 100 (e.g., the computing devices 110) can be any type of computing device capable of connecting to the system 100 and/or communicating with the data analytics service 106 via a suitable data communications network such as, but not limited to, a laptop or desktop computer, a tablet computing device, a server computer, or a smartphone.

Administrative users employed by the owner or operator of network-based analytics system 100, such as administrators managing the operation of the data analytics service 106, and/or the computing devices of the system 100, can also connect with, manage, and utilize resources provided by the system 100 in a similar fashion. Additional details regarding the configuration and operation of the network-based analytics system 100 will be provided below with regard to FIGS. 7-10.

In the example of FIG. 1, and without limitation, the network-based analytics system 100 can implement a network-based, data analytics service 106. The data analytics service 106 can perform analytics (e.g., in real-time) on streaming data so that customers 104 of the service 106 are able to gain valuable insights into the data. The incoming data is shown in FIG. 1 in the form of incoming data streams 102 that are ingested (or otherwise received) by the network-based analytics system 100 via a booking component 112. In some cases, booking component 112 may determine a data bucket 108 in which a data item 114 received from the data streams 102 will ultimately be stored on based on a data bucket time window associated with the data bucket 108 when the data item 114 was received. For example, the incoming data stream 102 received by the booking component 112 may be discretized into data buckets 108 based on a time window associated with each of the data buckets 108 receiving the data items, such as the data item 114. In some cases, the booking component 112 may query a data bucket table 116 to determine which data bucket 108 is currently assigned to be receiving data item(s) 114 based on a time window currently being experienced. By way of example, in a given hour, the system 100 may process the data item(s) 114 received via the incoming data stream 102 into sixty different data buckets 108 based on one-minute time intervals. That is, every minute, the system 100 identifies the current data bucket 108 that will receive the processed data item(s) 114 and tags, or otherwise associates, the incoming data item(s) 114 with that data bucket 108 based on which time interval they are received in. In some cases, the incoming data stream 102 may be an unbounded and ordered collection of data where the time between one data item and subsequent item being available in the stream can be infinitely small. In some examples, a data bucket 108 may include a bounded collection of data item(s) 114 that remains immutable after it is finalized and published. That is, once a data bucket 108 is determined to be complete, the data bucket 108 may remain unchanged over time and a record may be generated (e.g., via the data bucket table 116) documenting the state of the bucket 108 as being immutable and/or finalized.

The incoming data streams 102 can relate to any type of data and/or a service associated with the system 100, such as, but not limited to, web service data, microservice data, log data, application data (e.g., mobile application data), sensor data, transaction data, financial data, and the like. The services related to the incoming data streams 102 may be provided by the system 100 and/or another system that is associated with and/or in communication with the system 100. In one example, the incoming data stream 102(1) may pertain to clickstream data, such as data that indicates when customers select an element of interest on a website and/or mobile application. As another example, another customer 104(2) may configure an Internet of Things (IoT) device(s) to provide a continuous flow of IoT data to the system 100 as another incoming data stream 102(2), and the customer's 104(2) application(s) (which may be operated by the system 100) may be executed against that incoming data stream 102(2) to output query results from the stream of IoT data. Other examples of incoming data streams 102 include, without limitation, stock trading data, audience tracking data, order placement data, and the like.

In an example process, when a data item 114 is received (e.g., via the incoming data stream 102), the booking component 112 may access the data bucket table 116 to determine a current time window and/or a data bucket 108 associated with that time window. In some cases, the booking component 112 may determine if a current data bucket receiving data items from the incoming data streams 102 can be finalized (e.g., if the current data bucket is complete) and the booking component 112 may perform a data bucket rotation action which may include updating data bucket table 116 to insert a new data bucket 108 and generating data divider(s) 118 to be inserted into a table component 120 (e.g., an audit log table). The number of data dividers 118 generated may depend on a number of partitions being used to process the data items 114 and each data divider 118 may be assigned a particular partition (e.g., via a partition key) for processing when the data divider 118 is generated. For example, the data dividers and the data items may ultimately be posted to a data stream, via a streaming component 122, to be processed into their respective data buckets 108. As discussed in further detail below, the data stream may include multiple shards made up of logical partitions used for parallel processing of the data items 114. Each logical partition may include the data items 114 to be processed as well as a single data divider 118 ordered at the end of the partition such that the data divider 118 is the last item to be processed. In some cases, an application programming interface (API) of the system 100 may be utilized to insert individual data dividers 118 at an end processing side of individual partitions such that the individual data dividers 118 are processed after individual data items 114 within the individual partitions.

In some examples, as discussed below, the data dividers 118 may be JSON objects. However, is its to be understood that other filing formats may be used within the system 100 in order to receive, process, and/or transmit data files. In some cases, the data dividers 118 may include time window data indicating a year, month, day, and/or time in which the data dividers 118 were generated. In some cases, a partition may be considered as a grouping of one or more data items 114 and/or a data divider(s) 118 into multiple non-overlapping sets, such that the data items 114 and/or the data dividers 118 may be processed in parallel. In some examples, a data item, such as the data item 114, may be configured to be both a data item as well as a data divider, such as the data divider 118. For example, in this case, the last data item to be ordered into a partition may be tagged with or otherwise configured to include an identifier identifying it as a data divider. Once the data item including the data divider ID is processed, the system 100 may determine that all of the data items in the particular partition have been processed.

In some examples, prior to being posted to the data stream via the streaming component 122, the table component 120 may be configured with triggers such that all new inserts of items (e.g., data items 114 and/or data dividers 118) into the table component 120 will be assessed by a repartitioning component 124. In some cases, the repartitioning component 124 may include a repartitioning Lambda having logic to assign a partition to a data item, such as the data item 114. For example, for new items that trigger the logic, the repartitioning component 124 may first check if the item is a data item (e.g., data item 114) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item, such as the data item 114, the repartitioning component 124 may assign a particular partition (e.g., via a partition key) for processing. In this way, each data item, such as the data item 114, may include a data bucket ID based on the time window the data item was received and a logical partition number identifying which partition the data item is to be processed in. In some cases, the repartitioning component 124 may randomly assign the partition to the data item(s) 114 in order to increase load balancing on the system 100.

In some cases, once the data item 114 has been assigned to a partition, the data item 114 and the data divider 118 may be posted to a data stream 126 via the streaming component 122. The data stream 126 may be used by the system 100 to ingest, collect, and/or process data from applications and service logs, clickstream data, sensor data, and/or in-app user events to power live dashboards, generate metrics, and/or deliver data into data buckets. For example, the data stream 126 may include multiple shards used for parallel processing of the incoming data stream 102. In some examples, each logical partition may be contained within a single shard. In some examples, multiple logical partitions may be on the same shard, but no logical partition will be spread on multiple shards. Each shard may be configured such that that the records (e.g., data item(s) 114) in the shard have their order maintained. That is, the data item(s) 114 are ordered within the shard based on the order in which the data item(s) were received. Additionally, the shard may be configured such that the data divider 118 will always be the last record processed for the logical partition.

In some examples, a processing component 128 may process the data stream 126 into the data bucket 108 and determine when all of the data divider(s) 118 have been processed to determine that the data bucket 108 may be finalized. For example, the processing component 128 may be informed of the number of data divider(s) 118 generated for the current time window and process each shard within the data stream 126. As the processing component 128 processes each partition within each shard of the data stream 126, the processing component 128 may encounter the data divider(s) 118 at the end of each partition, thereby indicating to the processing component 128 that there are no more data item(s) 114 within that particular partition. Once the processing component 128 has processed the same number of data divider(s) 118 as the number of data divider(s) generated for the current time window, the processing component 128 may determine that all of the data item(s) 114 for the current time window have been processed and the data bucket 108 may be finalized. In some examples, once the data bucket 108 has been finalized, the system 100 and/or the processing component 128 may inform (e.g., transmit a message) to the data bucket table 116 that the data bucket 108 for the current time window is finalized and the data bucket table 116 may record the status of the data bucket 108 as finalized and/or complete. In some examples, once a data bucket 108 has been finalized and/or indicated to have been completed, the system 100 may rotate processing of the incoming data stream 102 to a new data bucket based on a time window associated with the new data bucket and the incoming data stream 102 being received during that time window.

By way of example, if one-hundred data divider(s) 118 were generated for 100 logical partitions when data item(s) 114 were received during a particular time window, then the system one-hundred may determine that all of the data item(s) 114 arrived at the data bucket 108 associated with the time window after all one-hundred data divider(s) 118 were processed by the processing component 128 and the data bucket 108 can be considered finalized and/or complete. Thus, this will result in minimal delay in data bucket rotations, which require that a data bucket 108 be finalized, because there is no need to implement a time buffer (e.g., a cool down time) to deem that the data bucket 108 is finalized after not observing its data bucket key for a period of time.

In some cases, the system 100 may store monitoring components to detect and respond to failure scenarios in which the booking component 112 crashes during a data bucket rotation and the data dividers are not successfully inserted. For example, in response to detecting a failure scenario, the system 100 may perform one or more actions, such as rebooting, sending an error message to a data engineer, sending a message to a client, etc.

In an illustrative example, the customer 104(1) of the data analytics service 106 may own and/or operate a website that services requests from users. The customer 104(1) can utilize the data analytics service 106 to analyze a continuous flow of data (e.g., clickstream data) that is received from the customer's web server(s) as an incoming data stream 102(1). In other embodiments, the website by the customer may be hosted by a service provider associated with the data analytics service 106, and the incoming data stream 102(1) may be received directly by computing devices/resources of the service provider. In some cases, the booking component 112 may determine a data bucket 108 in which a data item 114 received from the incoming data streams 102 will ultimately be stored on based on a data bucket time window associated with the data bucket 108 when the flow of data is receive from the customer's web server(s) (or servers of the service provider). For example, the clickstream data received by the booking component 112 may be discretized into data buckets 108 based on a time window associated with each of the data buckets 108 receiving the click streaming data (e.g., data item(s) 114). For example, the data item 114 may include time window data reading "time_interval://2024-01-24T16:45:00Z/2024-01-24T16:50:00Z." In this case, the time window data may indicate that the data item 114 was received by the system 100 on Jan. 24, 2024 between a time window 6:45 and 6:50. This particular time window may be associated with a particular data bucket 108 into which the data item 114 is to be processed and the booking component 112 may tag and/or otherwise provide an identifier to the data item that identifies the particular data bucket 108.

In the aforementioned example, when the clickstream data is received (e.g., via the incoming data stream 102), the booking component 112 may determine a number of partitions necessary to process the clickstream data and may generate data dividers 118 to be inserted into each partition. Once the clickstream data has been stored by the table component 120 and the data dividers 118 have been generated (or otherwise identified or retrieved), the table component 120 may be configured with logic and/or triggers to assign a partition to each data item that makes up the clickstream data, such as the data item 114. For example, for new items that trigger the logic, the repartitioning component 124 may first check if the item is a data item (e.g., clickstream data) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item, such as the clickstream data, the repartitioning component 124 may assign a particular partition (e.g., via a partition key) for processing.

Once each data item of the clickstream data has been assigned to a partition, the clickstream data and the data divider 118 may be posted to a data stream 126 via the streaming component 122 such that the data item(s) 114 are ordered within the partition based on the order in which the data item(s) were received. Additionally, the partition may be configured such that the data divider 118 will always be the last record processed for the logical partition. Each data divider 118 may include a data divider ID that enables the system 100 to distinguish from data dividers and data objects when organizing the data dividers and data object into partitions such that the data dividers are always the last item to be processed in the partition. The processing component 128 may be informed of the number of data divider(s) 118 generated for the current time window and process each shard and partition within the data stream 126. As the processing component 128 processes each partition within each shard of the data stream 126, the processing component 128 may encounter the data divider(s) 118 at the end of each partition, thereby indicating to the processing component 128 that there are no more data items of the clickstream data within that particular partition. Once the processing component 128 has processed the same number of data divider(s) 118 as the number of data divider(s) generated for the current time window, the processing component 128 may determine that all of the clickstream data for the current time window have been processed and the data bucket 108 may be finalized. That is, the processing component 128 may determine that any data within the incoming data stream 102 that is received subsequent to the data divider(s) is to be placed in another data bucket 108 different than the finalized data bucket 108. Subsequently received data items will then be stored in this other data bucket 108 as the data items are received.

Figure 2:
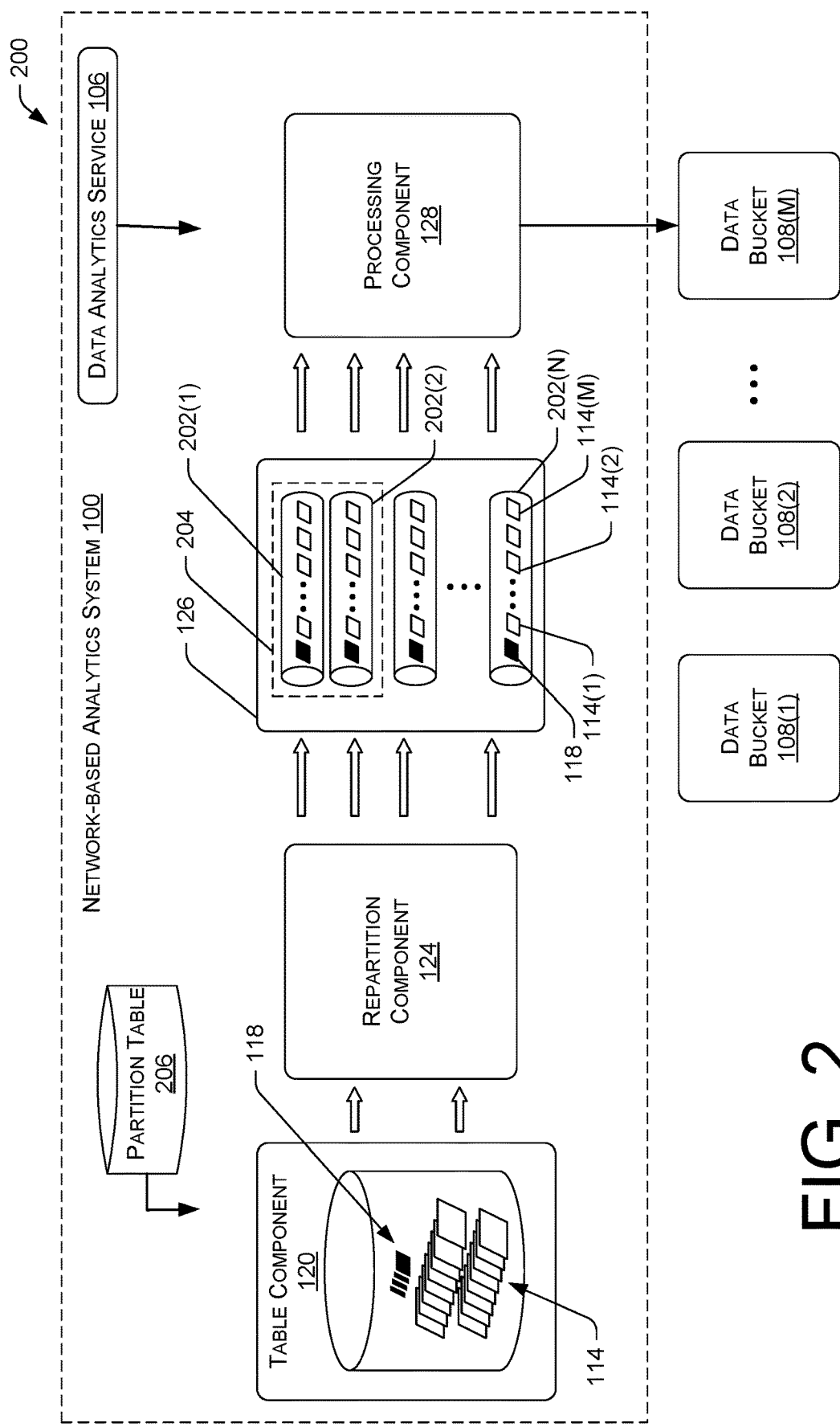
FIG. 2 is another software and network architecture diagram showing aspects of the operation of a network-based analytics system to process incoming data streams into partitions.

FIG. 2 is a block diagram of an illustrative system 200 providing data analytics service 106 for discretizing continuous data flows using data dividers within logical partitions. The system 200 may include at least some components that are similar or the same as components included in the system 100 shown in FIG. 1.

The system 200 may include the repartition component 124, which as discussed above, may be used to randomly assign received data items to logical partitions for processing. In some examples, prior to being posted to the data stream 126 via the streaming component 122, the table component 120 may be configured with triggers such that all new inserts of items (e.g., data items 114 and/or data dividers 118) into the table component 120 will be assessed by the repartitioning component 124. In some cases, the repartitioning component 124 may include a repartitioning Lambda having logic to assign a partition to the data items 114. For example, for new items that trigger the logic, the repartitioning component 124 may first check if the item is a data item (e.g., data item 114) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item without a partition identifier, such as the data item 114, the repartitioning component 124 may assign a partition 202 (e.g., via a partition key) for processing. In this way, each data item 114 may include a data bucket ID based on the time window the data item 114 was received and a logical partition number identifying the partition 202 the data item is to be processed in. In some cases, the repartitioning component 124 may randomly assign the partition 202 to the data item(s) 114 in order to increase load balancing on the system 100. In some cases, the repartitioning component 124 may store additional logic causing the repartitioning component 124 to ensure that, for a logical partition count "n", the repartitioning component 124 monitors and stores logic to ensure "n" is always above a number of shards in the data stream 126.

In some cases, once the data item 114 has been assigned to the partition 202, the data item 114 and the data divider 118 may be posted to the data stream 126 via the streaming component 122. For example, the data stream 126 may include multiple shards, such as shard 204, used for parallel processing of the incoming data stream 102. In some examples, each logical partition 202 may be contained within a single shard, such as shard 204. In some cases, multiple logical partitions 202 may be on the same shard (as is the case in the example shard 204), but no logical partition 202 will be spread on multiple shards. Each shard may be configured such that that the records (e.g., data item(s) 114(1), 114(2) . . . 114(M))) in the shard have their order maintained. That is, the data item(s) 114 are ordered within the shard based on the order in which the data item(s) 114 were received. Additionally, the shard may be configured such that the data divider 118 will always be the last record processed for the logical partition (e.g., regardless of the order of the preceding data item(s) 114 in the partition).

In some examples, the processing component 128 may process the data stream 126 into the data bucket 108 and determine when all of the data divider(s) 118 have been processed to determine that the data bucket 108 may be finalized. For example, the processing component 128 may be informed of the number of data divider(s) 118 generated for the current time window and process each shard within the data stream 126. As the processing component 128 processes each partition 202 within each shard of the data stream 126, the processing component 128 may encounter the data divider(s) 118 at the end of each partition 202, thereby indicating to the processing component 128 that there are no more data item(s) 114 within that particular partition 202. Once the processing component 128 has processed the same number of data divider(s) 118 as the number of data divider(s) generated for the current time window, the processing component 128 may determine that all of the data item(s) 114 for the current time window have been processed and the data bucket 108 may be finalized. In some examples, once the data bucket 108 has been finalized, the system 100 and/or the processing component 128 may inform (e.g., transmit a message) to the data bucket table 116 that the data bucket 108 for the current time window is finalized and the data bucket table 116 may record the status of the data bucket 108 as finalized and/or complete.

In some examples, the system 100 may include a partition table 206 configured to track a status of each of the partition(s) 202 based on partition status metadata. For example, prior to the data divider 118 for each partition 202 having been processed, the status for the partition 202 may be determined as in-process and/or open. In some cases, once the data divider 118 has been processed, the status of the partition 202 may be determined as ended and/or closed and the partition table 206 may change a status of the partition 202 from in-process to ended and/or from open to closed. In some cases, once all of the partitions 202 have an ended and/or closed status indicated by the partition table 206, the system 100 may determine that all of the data item(s) 114 for the current time window have been processed and the data bucket 108 may be finalized.

Figure 2A:
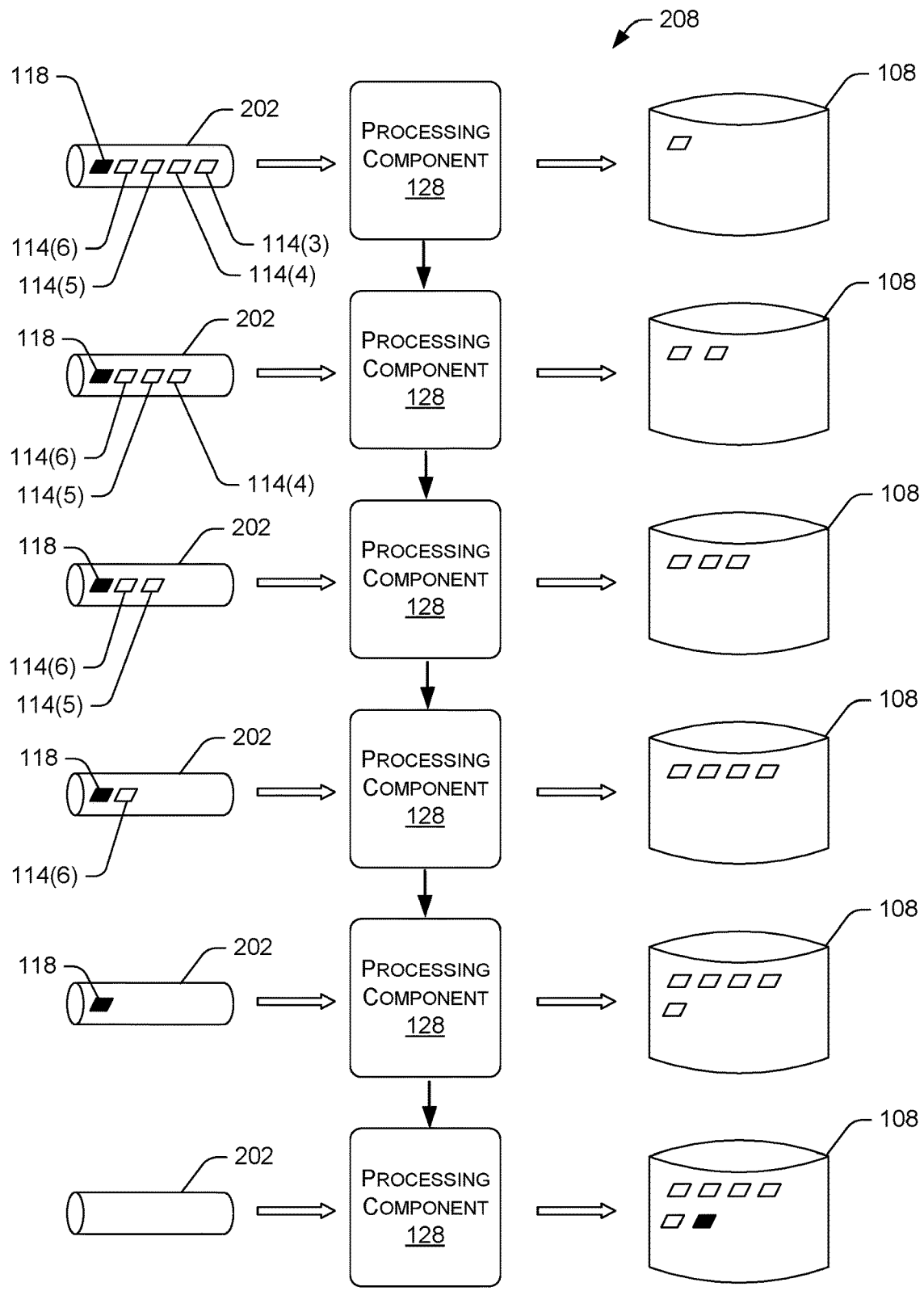
FIG. 2A is another software and network architecture diagram showing aspects of the operation of a network-based analytics system to process incoming data streams into partitions and data buckets.

FIG. 2A is a diagram of an illustrative system 208 providing a processing component 128 for processing data flows using data dividers within logical partitions. The system 208 may include at least some components that are similar or the same as components included in the system 100 shown in FIG. 1.

The system 208 may include the processing component 128 which may process the partition 202 containing the data items 114(3), 114(4), 114(5), 114(6) and the data divider 118. The partition 202 of the system 208 may be the same or similar to the partition 202(1) as described in FIG. 2, in that the partition 202 of the system 208 may be one of multiple partitions within a shard and/or a data stream, such as the shard 204 and/or the data stream 126. Once the data items 114(3), 114(4), 114(5), 114(6) and the data divider 118 have been assigned to the partition 202, the data item 114 and the data divider 118 may be posted to the data stream 126 via the streaming component 122 to be processed by the processing component 128. The partition 202 may be ordered such that data item(s) 114(3), 114(4), 114(5), 114(6) may be processed by the processing component 128 prior to the data divider 118 being processed. As illustrated in FIG. 2A, the data item 114(3) may be processed first into the data bucket 108, followed by the data item 114(4), then data item 114(5), then data item 114(6), until the data divider 118 is the last item in the partition 202. After the processing component 128 processes the data divider 118, the system 100 may determine that the partition 202 no longer has any data items located within it because the data divider 118 was ordered at the end of the partition.

Figure 3A:
FIG. 3A is a diagram illustrating an example data item.

FIGS. 3A-3C are diagrams illustrating data items 300(1) and 300(2) processed by the booking component 112 and data dividers 302(1) and 302(2) that may be generated by the booking component 112 and/or the system 100, as introduced in FIG. 1. In this example, the data items 300(1) and 300(2) correspond to data item(s) 114 and the data dividers 302(1) and 302(2) correspond to data dividers 118. The data items 300(1) and 300(2) and the data dividers 302(1) and 302(2) illustrated in FIGS. 3A-3C are shown as JSON objects surrounded by "{" and "}". However, is its to be understood that other filing formats may be used within the system 100 in order to receive, process, and/or transmit data files.

Each of the data items 300(1) and 300(2) may include time window data 304 and a partition identifier 306 assigned to the data items 300(1) and 300(2) via the repartitioning component 124, as explained above. For example, the data item 300(1) may include time window data 304(1) reading "time_interval://2024-01-24T16:45:00Z/2024-01-24T16:50:00Z." In this case, the time window data 304(1) may indicate that the data item 300(1) was received by the system 100 on Jan. 24, 2024 between a time window 16:45 and 16:50. As discussed above, this time window data 304(1) may be associated with a particular data bucket 108 into which the data item 302(1) is to be processed. In some examples, the data item 300(1) may include a partition ID 306(1) which reads "logicalPartition: 1". As discussed above, in some cases, the repartitioning component 124 may randomly assign a partition ID to the data items 300(1) and 300(2) such that the data items 300(1) and 300(2) may be organized into their respective partition (e.g., partitions 202(1), 202(2), . . . 202(N)) when being posted to a data stream (e.g., the data stream 126).

Referring to FIG. 3B, the data item 300(2) may include time window data 304(2) reading "time_interval://2024-01-24T16:45:00Z/2024-01-24T16:50:00Z." In this case, the time window data 304(2) may indicate that the data item 300(2) was received by the system 100 on Jan. 24, 2024 between a time window 16:45 and 16:50. In some examples, the data item 300(2) may include a partition ID 306(2) which reads "logicalPartition: 2". That is, in this case, both of the data items 300(1) and 300(2) were received during the same time window (e.g., "2024-01-24T16:45:00Z/2024-01-24T16:50:00Z") but were assigned to different partitions (e.g., partition "1" or partition "2"). Thus, each of the data items 300(1) and 300(2) will be processed into the same data bucket 108 via different partitions within the data stream.

Referring to FIG. 3C, the data divider 302(1) may include time window data 304(3) reading "time_interval://2024-01-24T16:45:00Z/2024-01-24T16:50:00Z." In this case, the time window data 304(3) may indicate that the data divider 302(1) was generated by the system 100 on Jan. 24, 2024 for a time window between 16:45 and 16:50. The number of data dividers (e.g., data dividers 302(1) and 302(2)) generated may depend on a number of partitions being used to process the data items (e.g., data items 300(1) and 300(2)) and each data divider may be assigned a partition ID (e.g., via a partition key) for processing when the data divider is generated. For example, the data divider 302(1) may include a partition ID 306(3) which reads "logicalPartition: 1". Additionally, the data divider 302(1) may include a data divider ID 308(1) which reads "isDivider: true", thereby identifying the data divider 302(1) as a data divider, as opposed to a data item. The data divider ID 308(1) may enable the system 100 to distinguish from data dividers and data objects when organizing the data dividers and data object into partitions such that the data dividers are always the last item to be processed in the partition.

For example, the data dividers and the data items may ultimately be posted to a data stream, via a streaming component 122, to be processed into their respective data buckets 108. As discussed in further detail above, the data stream may include multiple shards made up of logical partitions used for parallel processing of the data items. Each logical partition may include the data items to be processed as well as a single data divider ordered at the end of the partition such that the data divider is the last item to be processed. In this way, the system 100 may determine that all of the data items for a given data bucket have been processed once all of the data dividers, which are at the end of each partition, have been processed.

Referring again to FIG. 3C, the data divider 302(2) may include time window data 304(4) reading "time_interval://2024-01-24T16:45:00Z/2024-01-24T16:50:00Z." In this case, the time window data 304(4) may indicate that the data divider 302(2) was generated by the system 100 on Jan. 24, 2024 for a time window between 16:45 and 16:50. The data divider 302(2) may also include a partition ID 306(4) which reads "logicalPartition: 2". Additionally, the data divider 302(2) may include a data divider ID 308(2) which reads "isDivider: true", thereby identifying the data divider 302(2) as a data divider, as opposed to a data item. That is, in this case, both of the data dividers 302(1) and 302(2) were generated during the same time window (e.g., "2024-01-24T16:45:00Z/2024-01-24T16:50:00Z") and were assigned to different partitions (e.g., partition "1" or partition "2"). Thus, each of the data dividers 302(1) and 302(2) will be processed into the same data bucket 108 via different partitions within the data stream.

FIGS. 4A, 4B, 5, and 6 are flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4A:
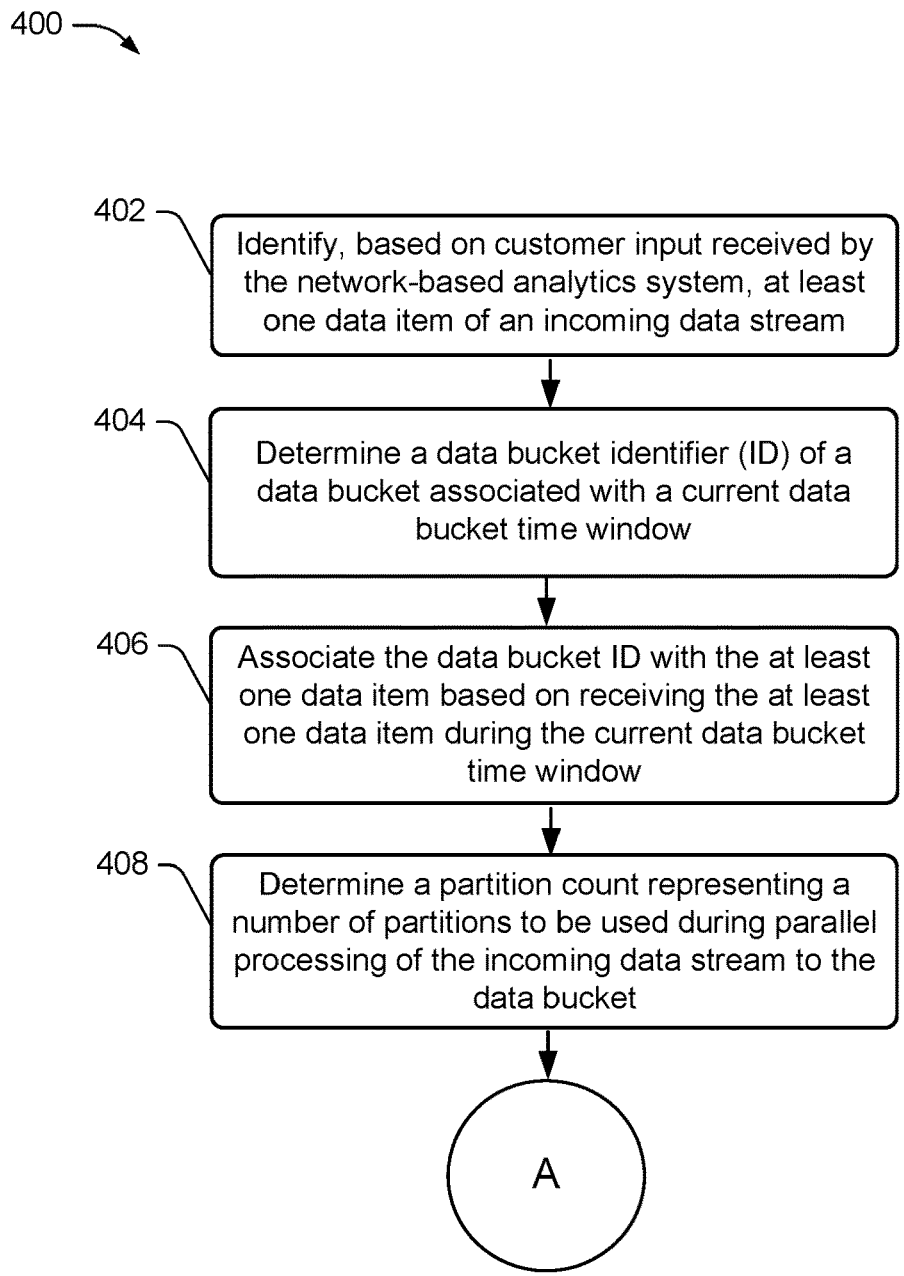
FIGS. 4A and 4B are flow diagrams of an example process for generating one or more data dividers for a data stream and determining that a data bucket is complete based on processing the data dividers.
Figure 4B:
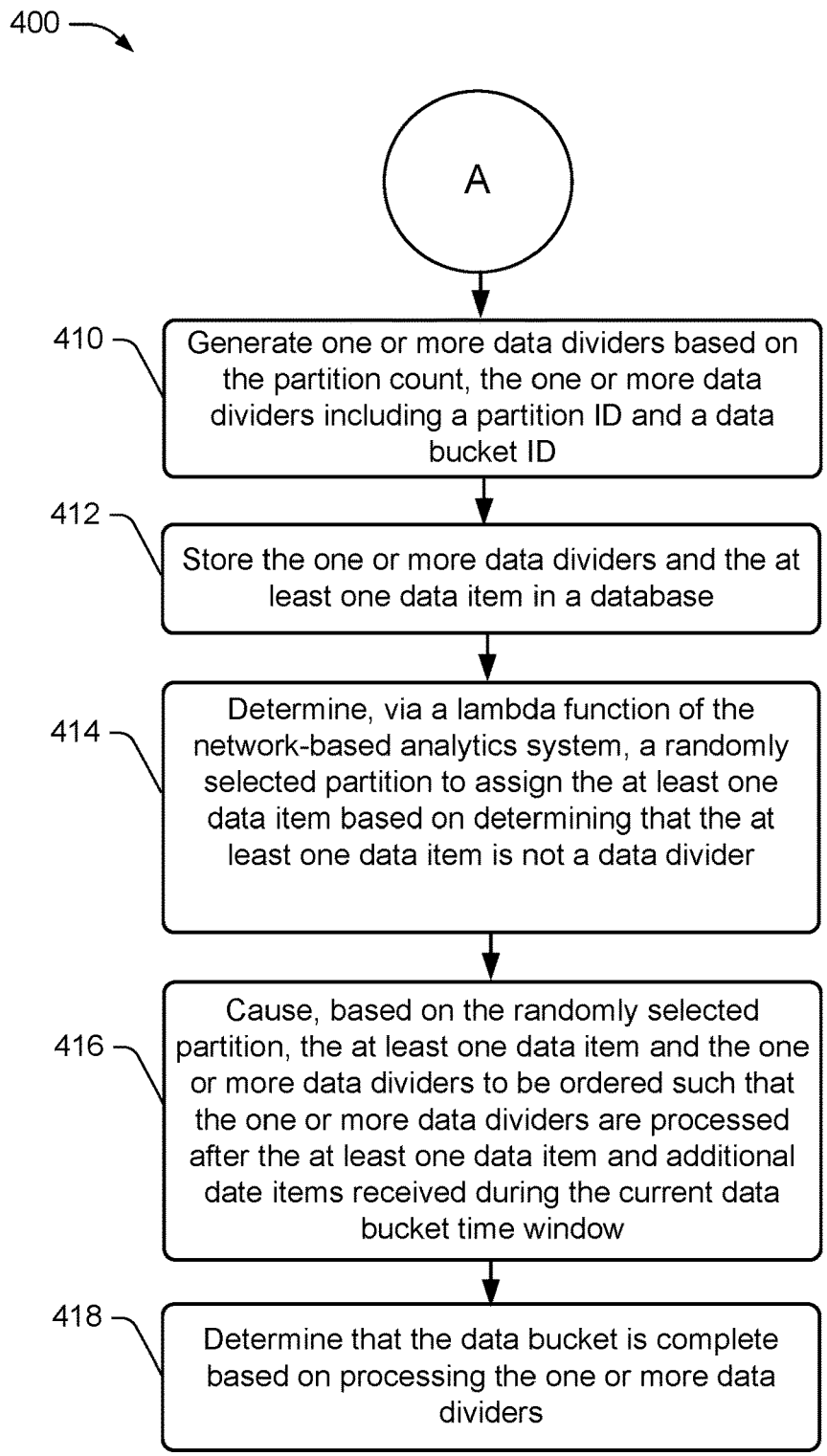

FIGS. 4A and 4B are flow diagrams of an example process 400 for generating one or more data dividers for a data stream and determining that a data bucket is complete based on processing the data dividers. The process 400 is described, by way of example, with reference to the previous figures. Although the process 400 is described as being performed by the data analytics service 106 of the network-based analytics system 100, the process 400 may be performed in other similar and/or different environments.

At 402, a data analytics service 106 of a network-based analytics system 100 may identify, based on customer input received by the network-based analytics system, at least one data item of an incoming data stream. For example, the data analytics service 106 can perform analytics (e.g., in real-time) on streaming data so that customers 104 of the service 106 are able to gain valuable insights into the data. The incoming data is shown in FIG. 1 in the form of incoming data streams 102 that are ingested (or otherwise received) by the network-based analytics system 100 via a booking component 112.

At 404, the data analytics service 106 of the network-based analytics system 100 may determine a data bucket identifier (ID) of a data bucket associated with a current data bucket time window. For example, booking component 112 may determine a data bucket 108 in which a data item 114 received from the data streams 102 will ultimately be stored on based on a data bucket time window associated with the data bucket 108 when the data item 114 was received.

At 406, the data analytics service 106 of the network-based analytics system 100 may associate the data bucket ID with the at least one data item based on receiving the at least one data item during the current data bucket time window. For example, the incoming data stream 102 received by the booking component 112 may be discretized into data buckets 108 based on a time window associated with each of the data buckets 108 receiving the data items, such as the data item 114. In some cases, the booking component 112 may query a data bucket table 116 to determine which data bucket 108 is currently assigned to be receiving data item(s) 114 based on a time window currently being experienced. By way of example, in a given hour, the system 100 may process the data item(s) 114 received via the incoming data stream 102 into sixty-different data buckets 108 based on one-minute time intervals. That is, every minute, the system 100 identifies the current data bucket 108 that will receive the processed data item(s) 114 and tags, or otherwise associates the incoming data item(s) 114 with that data bucket 108 based on which time interval they are received in.

At 408, the data analytics service 106 of the network-based analytics system 100 may determine a partition count representing a number of partitions to be used during parallel processing of the incoming data stream to the data bucket. After block 408, the process proceeds to "A" and continues on FIG. 4B where "A" is followed by block 410 where the data analytics service 106 of the network-based analytics system 100 may generate one or more data dividers based on the partition count, the one or more data dividers including a partition ID and a data bucket ID. For example, when a data item 114 is received (e.g., via the incoming data stream 102), the booking component 112 may access the data bucket table 116 to determine a current time window and/or a data bucket 108 associated with that time window. In some cases, the booking component 112 may determine if a current data bucket receiving data items from the incoming data streams 102 can be finalized (e.g., if the current data bucket is complete) and the booking component 112 may perform a data bucket rotation action which may include updating data bucket table 116 to insert a new data bucket 108 and generating data divider(s) 118 to be inserted into a table component 120 (e.g., an audit log table). The number of data dividers 118 generated may depend on a number of partitions being used to process the data items 114 and each data divider 118 may be assigned a particular partition (e.g., via a partition key) for processing when the data divider 118 is generated. For example, the data dividers and the data items may ultimately be posted to a data stream, via a streaming component 122, to be processed into their respective data buckets 108. As discussed in further detail below, the data stream may include multiple shards made up of logical partitions used for parallel processing of the data items 114. Each logical partition may include the data items 114 to be processed as well as a single data divider 118 ordered at the end of the partition such that the data divider 118 is the last item to be processed.

At 412, the data analytics service 106 of the network-based analytics system 100 may store the one or more data dividers and the at least one data item in a database and at 414, the data analytics service 106 of the network-based analytics system 100 may determine, via a lambda function of the network-based analytics system, a randomly selected partition to assign the at least one data item based at least in part on determining that the at least one data item is not a data divider. For example, prior to being posted to the data stream via the streaming component 122, the table component 120 may be configured with triggers such that all new inserts of items (e.g., data items 114 and/or data dividers 118) into the table component 120 will be assessed by a repartitioning component 124. In some cases, the repartitioning component 124 may include a repartitioning Lambda having logic to assign a partition to a data item, such as the data item 114. For example, for new items that trigger the logic, the repartitioning component 124 may first check if the item is a data item (e.g., data item 114) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item, such as the data item 114, the repartitioning component 124 may assign a particular partition (e.g., via a partition key) for processing. In this way, each data item, such as the data item 114, may include a data bucket ID based on the time window the data item was received and a logical partition number identifying which partition the data item is to be processed in. In some cases, the repartitioning component 124 may randomly assign the partition to the data item(s) 114 in order to increase load balancing on the system 100.

At 416, the data analytics service 106 of the network-based analytics system 100 may cause, based on the randomly selected partition, the at least one data item and the one or more data dividers to be ordered such that the one or more data dividers are processed after the at least one data item and additional date items received during the current data bucket time window. For example, once the data item 114 has been assigned to a partition, the data item 114 and the data divider 118 may be posted to a data stream 126 via the streaming component 122. For example, the data stream 126 may include multiple shards used for parallel processing of the incoming data stream 102. In some examples, each logical partition may be contained within a single shard. In some cases, multiple logical partitions may be on the same shard, but no logical partition will be spread on multiple shards. Each shard may be configured such that that the records (e.g., data item(s) 114) in the shard have their order maintained. That is, the data item(s) 114 are ordered within the shard based on the order in which the data item(s) were received. Additionally, the shard may be configured such that the data divider 118 will always be the last record processed for the logical partition.

At 418, the data analytics service 106 of the network-based analytics system 100 may determine that the data bucket is complete based on processing the one or more data dividers. For example, a processing component 128 may process the data stream 126 into the data bucket 108 and determine when all of the data divider(s) 118 have been processed to determine that the data bucket 108 may be finalized. For example, the processing component 128 may be informed of the number of data divider(s) 118 generated for the current time window and process each shard within the data stream 126. As the processing component 128 processes each partition within each shard of the data stream 126, the processing component 128 may encounter the data divider(s) 118 at the end of each partition, thereby indicating to the processing component 128 that there are no more data item(s) 114 within that particular partition. Once the processing component 128 has processed the same number of data divider(s) 118 as the number of data divider(s) generated for the current time window, the processing component 128 may determine that all of the data item(s) 114 for the current time window have been processed and the data bucket 108 may be finalized. In some examples, once the data bucket 108 has been finalized, the system 100 and/or the processing component 128 may inform (e.g., transmit a message) to the data bucket table 116 that the data bucket 108 for the current time window is finalized and the data bucket table 116 may record the status of the data bucket 108 as finalized and/or complete.

Figure 5:
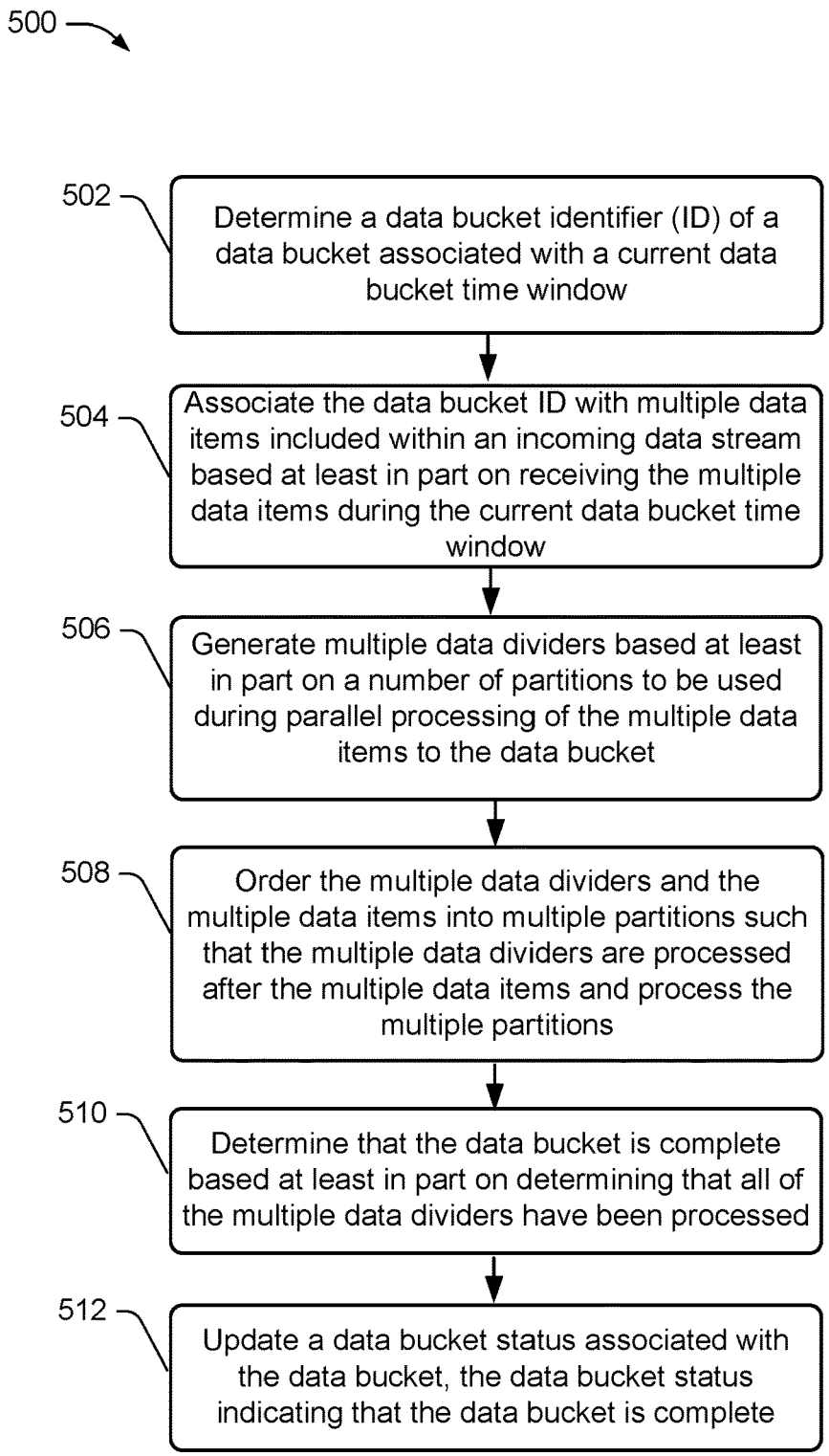
FIG. 5 is a flow diagram of an example process for updating a data bucket status based on processing data dividers.

FIG. 5 is a flow diagram of an example process 500 for updating a data bucket status based on processing the data dividers. The process 500 is described, by way of example, with reference to the previous figures. Although the process 500 is described as being performed by the data analytics service 106 of the network-based analytics system 100, the process 500 may be performed in other similar and/or different environments.

At 502, the data analytics service 106 of the network-based analytics system 100 may determine a data bucket identifier (ID) of a data bucket associated with a current data bucket time window. For example, booking component 112 may determine a data bucket 108 in which a data item 114 received from the data streams 102 will ultimately be stored on based on a data bucket time window associated with the data bucket 108 when the data item 114 was received.

At 504, the data analytics service 106 of the network-based analytics system 100 may associate the data bucket ID with multiple data items based at least in part on receiving the multiple data items during the current data bucket time window. For example, the incoming data stream 102 received by the booking component 112 may be discretized into data buckets 108 based on a time window associated with each of the data buckets 108 receiving the data items, such as the data item 114. In some cases, the booking component 112 may query a data bucket table 116 to determine which data bucket 108 is currently assigned to be receiving data item(s) 114 based on a time window currently being experienced. By way of example, in a given hour, the system 100 may process the data item(s) 114 received via the incoming data stream 102 into sixty different data buckets 108 based on one-minute time intervals. That is, every minute, the system 100 identifies the current data bucket 108 that will receive the processed data item(s) 114 and tags, or otherwise associates the incoming data item(s) 114 with that data bucket 108 based on which time interval they are received in.

At 506, the data analytics service 106 of the network-based analytics system 100 may generate multiple data dividers based at least in part on a number of partitions to be used during parallel processing of the multiple data items to the data bucket. For example, when a data item 114 is received (e.g., via the incoming data stream 102), the booking component 112 may access the data bucket table 116 to determine a current time window and/or a data bucket 108 associated with that time window. In some cases, the booking component 112 may determine if a current data bucket receiving data items from the incoming data streams 102 can be finalized (e.g., if the current data bucket is complete) and the booking component 112 may perform a data bucket rotation action which may include updating data bucket table 116 to insert a new data bucket 108 and generating data divider(s) 118 to be inserted into a table component 120 (e.g., an audit log table). The number of data dividers 118 generated may depend on a number of partitions being used to process the data items 114 and each data divider 118 may be assigned a particular partition (e.g., via a partition key) for processing when the data divider 118 is generated. For example, the data dividers and the data items may ultimately be posted to a data stream, via a streaming component 122, to be processed into their respective data buckets 108. As discussed in further detail below, the data stream may include multiple shards made up of logical partitions used for parallel processing of the data items 114. Each logical partition may include the data items 114 to be processed as well as a single data divider 118 ordered at the end of the partition such that the data divider 118 is the last item to be processed.

In some examples, prior to being posted to the data stream via the streaming component 122, the table component 120 may be configured with triggers such that all new inserts of items (e.g., data items 114 and/or data dividers 118) into the table component 120 will be assessed by a repartitioning component 124. In some cases, the repartitioning component 124 may include a repartitioning Lambda having logic to assign a partition to a data item, such as the data item 114. For example, for new items that trigger the logic, the repartitioning component 124 may first check if the item is a data item (e.g., data item 114) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item, such as the data item 114, the repartitioning component 124 may assign a particular partition (e.g., via a partition key) for processing. In this way, each data item, such as the data item 114, may include a data bucket ID based on the time window the data item was received and a logical partition number identifying which partition the data item is to be processed in. In some cases, the repartitioning component 124 may randomly assign the partition to the data item(s) 114 in order to increase load balancing on the system 100.

At 508, the data analytics service 106 of the network-based analytics system 100 may order the multiple data dividers and the multiple data items into multiple partitions such that the multiple data dividers are processed after the multiple data items and process the multiple partitions. For example, once the data item 114 has been assigned to a partition, the data item 114 and the data divider 118 may be posted to a data stream 126 via the streaming component 122. For example, the data stream 126 may include multiple shards used for parallel processing of the incoming data stream 102. In some examples, each logical partition may be contained within a single shard. In some cases, multiple logical partitions may be on the same shard, but no logical partition will be spread on multiple shards. Each shard may be configured such that the records (e.g., data item(s) 114) in the shard have their order maintained. That is, the data item(s) 114 are ordered within the shard based on the order in which the data item(s) were received. Additionally, the shard may be configured such that the data divider 118 will always be the last record processed for the logical partition.

At 510, the data analytics service 106 of the network-based analytics system 100 may determine that the data bucket is complete based at least in part on determining that all of the multiple data dividers have been processed. For example, a processing component 128 may process the data stream 126 into the data bucket 108 and determine when all of the data divider(s) 118 have been processed to determine that the data bucket 108 may be finalized. For example, the processing component 128 may be informed of the number of data divider(s) 118 generated for the current time window and process each shard within the data stream 126. As the processing component 128 processes each partition within each shard of the data stream 126, the processing component 128 may encounter the data divider(s) 118 at the end of each partition, thereby indicating to the processing component 128 that there are no more data item(s) 114 within that particular partition. Once the processing component 128 has processed the same number of data divider(s) 118 as the number of data divider(s) generated for the current time window, the processing component 128 may determine that all of the data item(s) 114 for the current time window have been processed and the data bucket 108 may be finalized.

At 512, the data analytics service 106 of the network-based analytics system 100 may update a data bucket status associated with the data bucket, the data bucket status indicating that the data bucket is complete. For example, once the data bucket 108 has been finalized, the system 100 and/or the processing component 128 may inform (e.g., transmit a message) to the data bucket table 116 that the data bucket 108 for the current time window is finalized and the data bucket table 116 may record the status of the data bucket 108 as finalized and/or complete.

Figure 6:
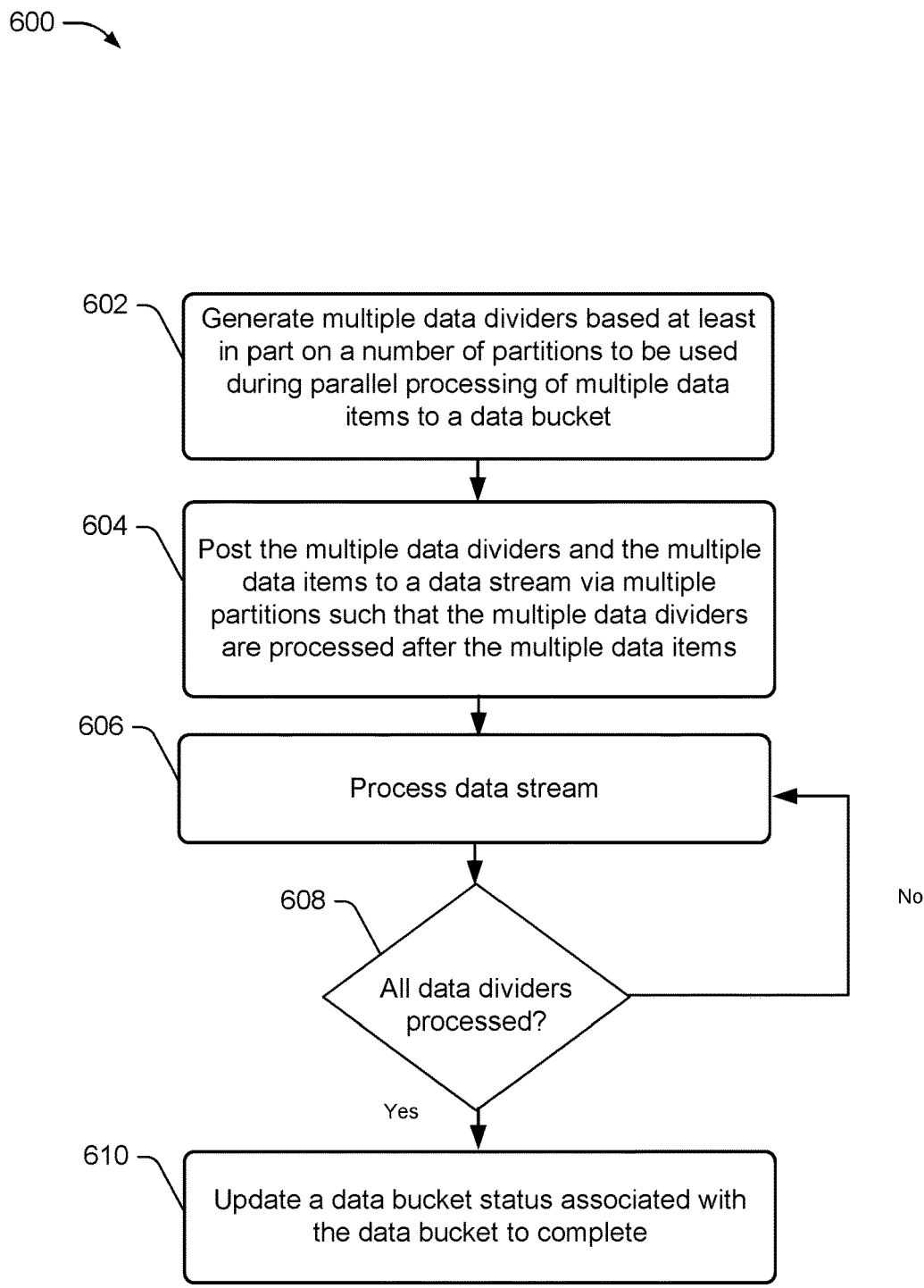
FIG. 6 is a flow diagram of an example process for updating a data bucket status based on processing data dividers.

FIG. 6 is a flow diagram of an example process 600 for updating a data bucket status based on processing the data dividers. The process 600 is described, by way of example, with reference to the previous figures. Although the process 600 is described as being performed by the data analytics service 106 of the network-based analytics system 100, the process 600 may be performed in other similar and/or different environments.

At 602, the data analytics service 106 of the network-based analytics system 100 may generate multiple data dividers based at least in part on a number of partitions to be used during parallel processing of multiple data items to a data bucket. For example, when a data item 114 is received (e.g., via the incoming data stream 102), the booking component 112 may access the data bucket table 116 to determine a current time window and/or a data bucket 108 associated with that time window. In some cases, the booking component 112 may determine if a current data bucket receiving data items from the incoming data streams 102 can be finalized (e.g., if the current data bucket is complete) and the booking component 112 may perform a data bucket rotation action which may include updating data bucket table 116 to insert a new data bucket 108 and generating data divider(s) 118 to be inserted into a table component 120 (e.g., an audit log table). The number of data dividers 118 generated may depend on a number of partitions being used to process the data items 114 and each data divider 118 may be assigned a particular partition (e.g., via a partition key) for processing when the data divider 118 is generated. For example, the data dividers and the data items may ultimately be posted to a data stream, via a streaming component 122, to be processed into their respective data buckets 108. As discussed in further detail below, the data stream may include multiple shards made up of logical partitions used for parallel processing of the data items 114. Each logical partition may include the data items 114 to be processed as well as a single data divider 118 ordered at the end of the partition such that the data divider 118 is the last item to be processed.

In some examples, prior to being posted to the data stream via the streaming component 122, the table component 120 may be configured with triggers such that all new inserts of items (e.g., data items 114 and/or data dividers 118) into the table component 120 will be assessed by a repartitioning component 124. In some cases, the repartitioning component 124 may include a repartitioning Lambda having logic to assign a partition to a data item, such as the data item 114. For example, for new items that trigger the logic, the repartitioning component 124 may first check if the item is a data item (e.g., data item 114) received via the incoming data stream 102 or a data divider, such as the data divider(s) 118. If the repartitioning component 124 determines that the item is a data divider 118, the repartitioning component 124 may take no action because the data divider(s) 118 may already include an assigned partition identifier (e.g., partition key) when the data divider(s) 118 are generated. If the repartitioning component 124 determines that the item is a data item, such as the data item 114, the repartitioning component 124 may assign a particular partition (e.g., via a partition key) for processing. In this way, each data item, such as the data item 114, may include a data bucket ID based on the time window the data item was received and a logical partition number identifying which partition the data item is to be processed in. In some cases, the repartitioning component 124 may randomly assign the partition to the data item(s) 114 in order to increase load balancing on the system 100.

At 604, the data analytics service 106 of the network-based analytics system 100 may post the multiple data dividers and the multiple data items to a data stream via multiple partitions such that the multiple data dividers are processed after the multiple data items. For example, once the data item 114 has been assigned to a partition, the data item 114 and the data divider 118 may be posted to a data stream 126 via the streaming component 122. For example, the data stream 126 may include multiple shards used for parallel processing of the incoming data stream 102. In some examples, each logical partition may be contained within a single shard. In some cases, multiple logical partitions may be on the same shard, but no logical partition will be spread on multiple shards. Each shard may be configured such that that the records (e.g., data item(s) 114) in the shard have their order maintained. That is, the data item(s) 114 are ordered within the shard based on the order in which the data item(s) were received. Additionally, the shard may be configured such that the data divider 118 will always be the last record processed for the logical partition.

At 606, the data analytics service 106 of the network-based analytics system 100 may process the data stream. For example, a processing component 128 may process the data stream 126 into the data bucket 108 and determine when all of the data divider(s) 118 have been processed to determine that the data bucket 108 may be finalized. For example, the processing component 128 may be informed of the number of data divider(s) 118 generated for the current time window and process each shard within the data stream 126. As the processing component 128 processes each partition within each shard of the data stream 126, the processing component 128 may encounter the data divider(s) 118 at the end of each partition, thereby indicating to the processing component 128 that there are no more data item(s) 114 within that particular partition. Once the processing component 128 has processed the same number of data divider(s) 118 as the number of data divider(s) generated for the current time window, the processing component 128 may determine that all of the data item(s) 114 for the current time window have been processed and the data bucket 108 may be finalized.

At 608, the data analytics service 106 of the network-based analytics system 100 may determine if all of the data dividers have been processed and, if "yes", the process proceeds to block 610 where the analytics service 106 of the network-based analytics system 100 may update a data bucket status associated with the data bucket to complete. For example, once the data bucket 108 has been finalized, the system 100 and/or the processing component 128 may inform (e.g., transmit a message) to the data bucket table 116 that the data bucket 108 for the current time window is finalized and the data bucket table 116 may record the status of the data bucket 108 as finalized and/or complete.

If, at block 608, the data analytics service 106 of the network-based analytics system 100 determines that all of the data dividers have not been processed, the process may proceed to block 606 and the data analytics service 106 of the network-based analytics system 100 may continue to process the data stream until all of the data dividers have been generated.

Figure 7:
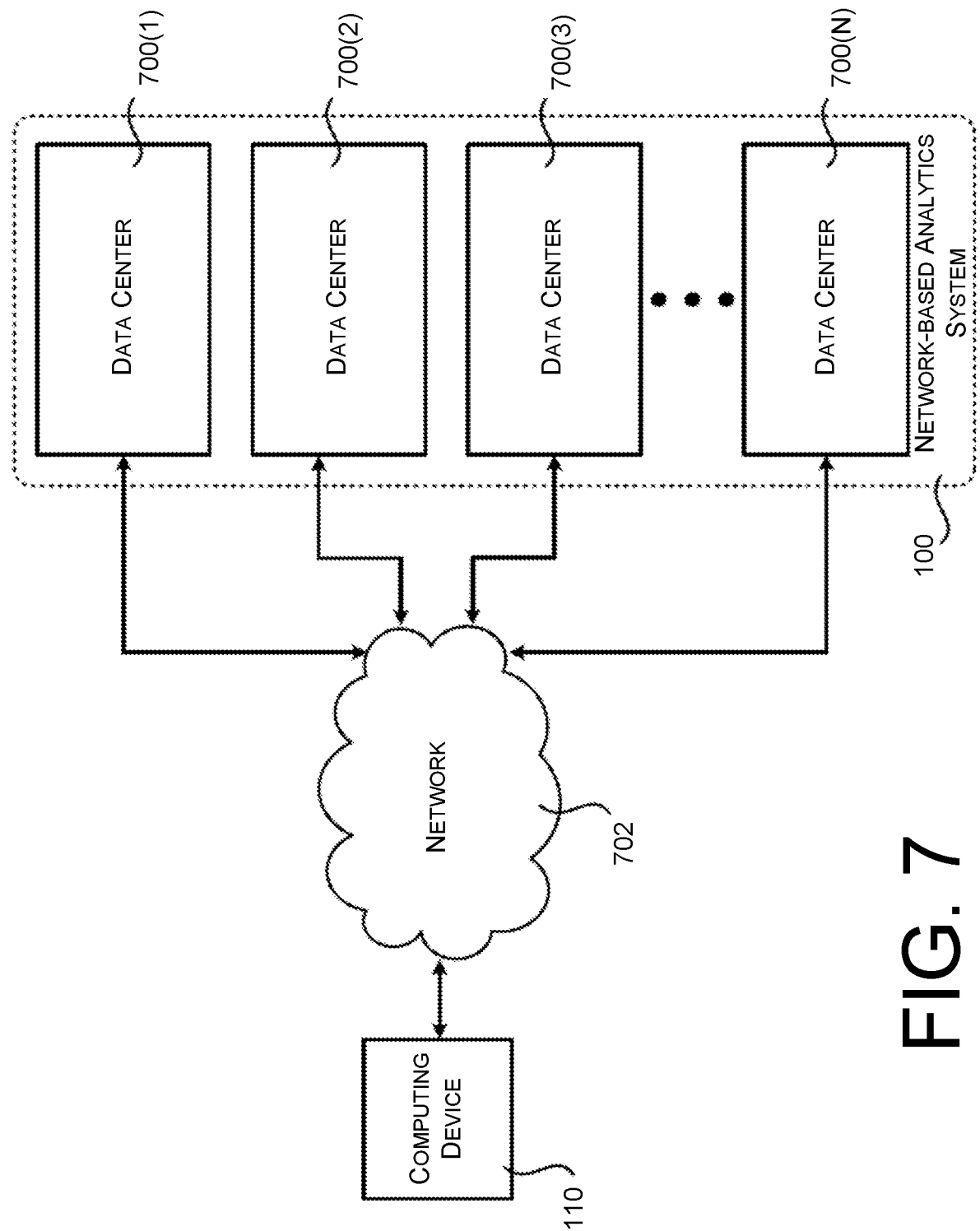
FIG. 7 is a system and network diagram that shows an illustrative operating environment that includes a network-based analytics system that can be configured to implement aspects of the functionality described herein.

FIG. 7 is a system and network diagram that shows an illustrative operating environment that includes a network-based analytics system 100 that can be configured to implement aspects of the functionality described herein. As discussed briefly above, the network-based analytics system 100 can execute network services, such as the data analytics service 106, that provide computing resources on a permanent or an as-needed basis. Among other types of functionality, the computing resources provided by network-based analytics system 100, or by a larger system of which the network-based analytics system 100 is a part, can be utilized to implement the various network services described herein. As also discussed above, the network-based analytics system 100 may be part of a larger system that provides the additional computing resources that include, without limitation, data storage resources, data processing resources, such as VM instances, networking resources, data communication resources, network services, and other types of resources.

Each type of computing resource provided by network-based analytics system 100, or by a larger system of which the network-based analytics system 100 is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network-based analytics system 100, or a larger system of which the network-based analytics system 100 is a part, can also be configured to provide other types of computing resources not mentioned specifically herein.

The computing resources provided by network-based analytics system 100, or a larger system of which the network-based analytics system 100 is a part, are enabled in one implementation by one or more data centers 700(1), 700(2), 700(3), . . . , 700(N) (collectively 700). The data centers 700 are facilities utilized to house and operate computer systems and associated components. The data centers 700 typically include redundant and backup power, communications, cooling, and security systems. The data centers 700 can also be located in geographically disparate locations. One illustrative configuration for a data center 700 that can be utilized to implement the technologies disclosed herein will be described below with regard to FIG. 8.

The users of the network-based analytics system 100 can access the computing resources provided by the network-based analytics system 100 over a network 702, which can be a wide area communication network ("WAN"), such as the Internet, an intranet or an Internet service provider ("ISP") network or a combination of such networks. For example, and without limitation, a computing device 110 operated by a user of the network-based analytics system 100 can be utilized to access the network-based analytics system 100 by way of the network 702. It should be appreciated that a local-area network ("LAN"), the Internet, or any other networking topology known in the art that connects the data centers 700 to remote customers and other users can be utilized. It should also be appreciated that combinations of such networks can also be utilized.

Figure 8:
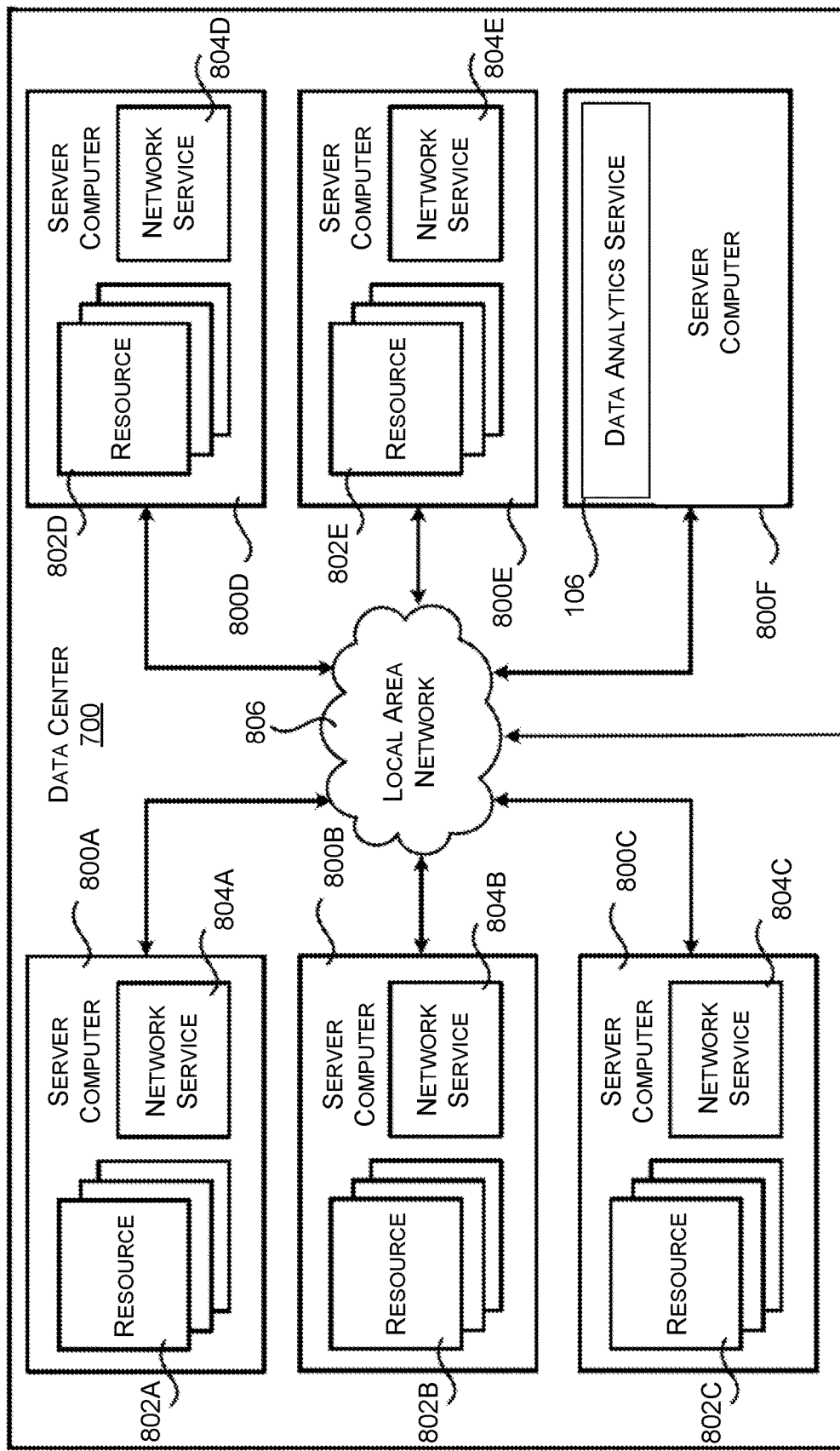
FIG. 8 is a computing system diagram illustrating a configuration for a data center that can be utilized to implement aspects of the technologies disclosed herein.

FIG. 8 is a computing system diagram that illustrates one configuration for a data center 700 that can be utilized to implement the data analytics service 106, and/or any other network services disclosed herein. The example data center 700 shown in FIG. 8 includes several server computers 800A-800E (collectively 800) for providing the computing resources 802A-802E (collectively 802), respectively.

The server computers 800 can be standard tower, rack-mount, or blade server computers configured appropriately for providing the various computing resources described herein (illustrated in FIG. 8 as the computing resources 802A-802E). As mentioned above, the computing resources 802 provided by the network-based analytics system 100, or a larger system of which the network-based analytics system 100 is a part, can include, without limitation, the booking component 112, the table component 120, the repartitioning component 123, the streaming component 122, the processing component 128, data storage resources (e.g., data bucket(s) 108), data processing resources such as VM instances or hardware computing systems, database resources (e.g., data bucket table 116, partition table 206, etc.), networking resources, and others. Some of the servers 800 can also be configured to execute network services 804A-804E (collectively 804) capable of instantiating, providing and/or managing the computing resources 802, some of which are described in detail herein.

The data center 700 shown in FIG. 8 also includes a server computer 800F that can execute some or all of the software components described above. For example, and without limitation, the server computer 800F can be configured to execute the data analytics service 106. The server computer 800F can also be configured to execute other components and/or to store data for providing some or all of the functionality described herein. In this regard, it should be appreciated that components or different instances of the data analytics service 106 can execute on many other physical or virtual servers in the data centers 700 in various configurations.

In the example data center 700 shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 700 described with reference to FIG. 8 is merely illustrative and that other implementations can be utilized.

Figure 9:
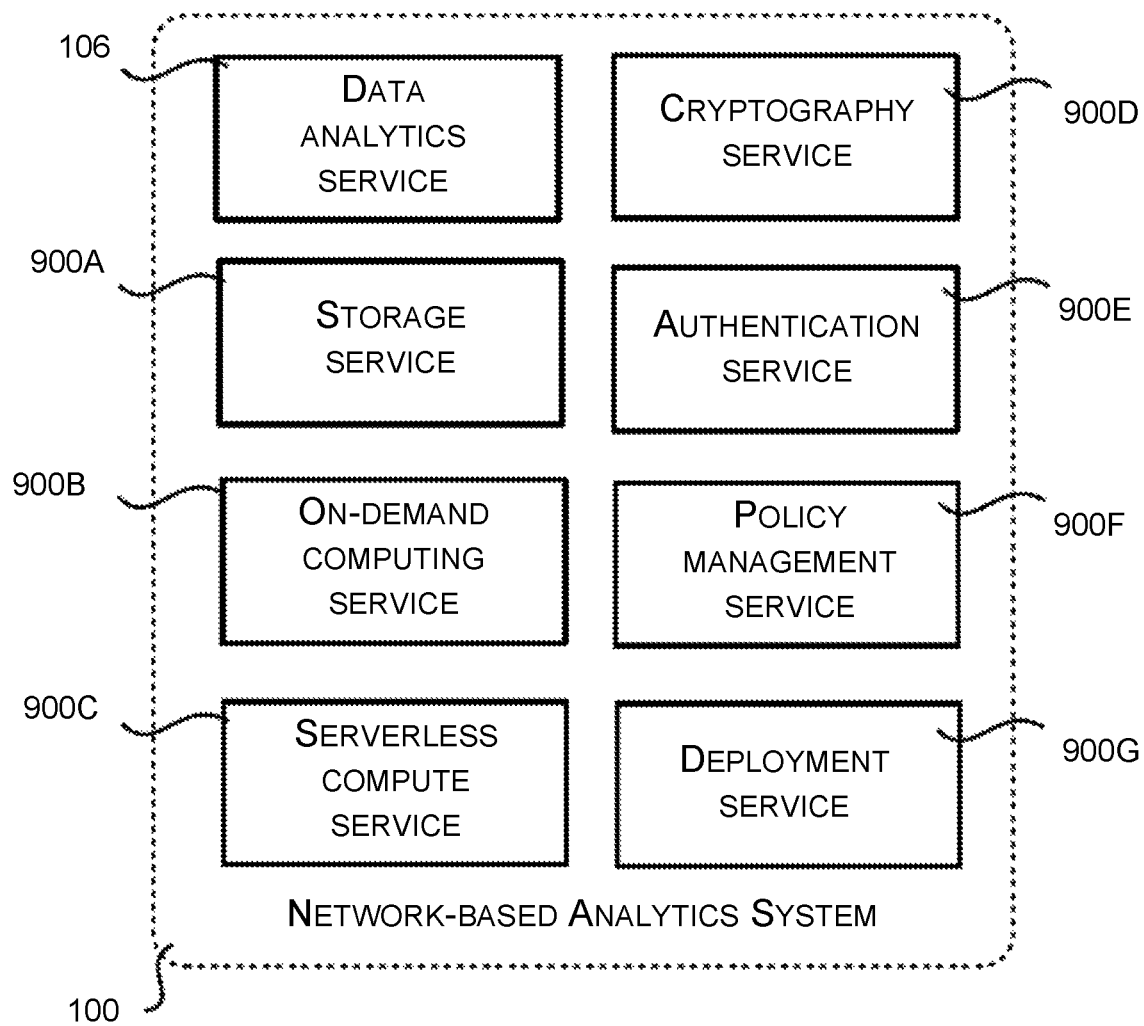
FIG. 9 is a network services diagram that shows aspects of several services that can be provided by and utilized within a network-based analytics system, or a larger system of which the network-based analytics system is a part, which is configured to implement the various technologies disclosed herein.

FIG. 9 is a network services diagram that shows aspects of several services that can be provided by and utilized within a network-based analytics system 100, or a larger system of which the network-based analytics system 100 is a part, which is configured to implement the various technologies disclosed herein. In particular, and as discussed above, the network-based analytics system 100, or a larger system of which the network-based analytics system 100 is a part, can provide a variety of network services to customers and other users including, but not limited to, the data analytics service 106, a storage service 900A, an on-demand computing service 900B, a serverless compute service 900C, a cryptography service 900D, an authentication service 900E, a policy management service 900F, and a deployment service 900G. The network-based analytics system 100, or a larger system of which the network-based analytics system 100 is a part, can also provide other types of network services, some of which are described below.

It is to be appreciated that users or customers of the network-based analytics system 100 can include organizations or individuals that utilize some or all of the network services provided by the network-based analytics system 100, or a larger system of which the network-based analytics system 100 is a part. As described above, customers 104 can communicate with the network-based analytics system 100 using an appropriate computing device 110 through a network, such as the network 702 shown in FIG. 7.

It is also noted that not all configurations described include the network services shown in FIG. 9 and that additional network services can be provided in addition to, or as an alternative to, the services explicitly described herein. Each of the services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from customers 104 of the network-based analytics system 100, or a larger system of which the network-based analytics system 100 is a part. The data stored by the storage service 900A can be obtained from computing devices 110 of customers.

The on-demand computing service 900B can be a collection of computing resources configured to instantiate VM instances and to provide other types of computing resources 802 on demand. For example, a user of the network-based analytics system 100, or a larger system of which the network-based analytics system 100 is a part, can interact with the on-demand computing service 900B (via appropriately configured and authenticated API calls, for example) to provision and operate VM instances that are instantiated on physical computing devices hosted and operated by the network-based analytics system 100, or a larger system of which the network-based analytics system 100 is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the network-based analytics system 100, or a larger system of which the network-based analytics system 100 is a part, to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the network-based analytics system 100, or a larger system of which the network-based analytics system 100 is a part. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The network-based analytics system 100, or a larger system of which the network-based analytics system 100 is a part, can also include a cryptography service 900D. The cryptography service 900D can utilize storage services of the network-based analytics system 100, or a larger system of which the network-based analytics system 100 is a part, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

The network-based analytics system 100, or a larger system of which the network-based analytics system 100 is a part, in various configurations, also includes an authentication service 900E and a policy management service 900F. The authentication service 900E, in one example, is a computer system (i.e., collection of computing resources 802) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the network-based analytics system 100, or a larger system of which the network-based analytics system 100 is a part. The policy management service 900F can include an interface (e.g., API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The network-based analytics system 100, or a larger system of which the network-based analytics system 100 is a part, can additionally maintain other network services based, at least in part, on the needs of its customers. For instance, the network-based analytics system 100, or a larger system of which the network-based analytics system 100 is a part, can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The network-based analytics system 100, or a larger system of which the network-based analytics system 100 is a part, can also be configured with other network services not specifically mentioned herein in other configurations.

Figure 10:
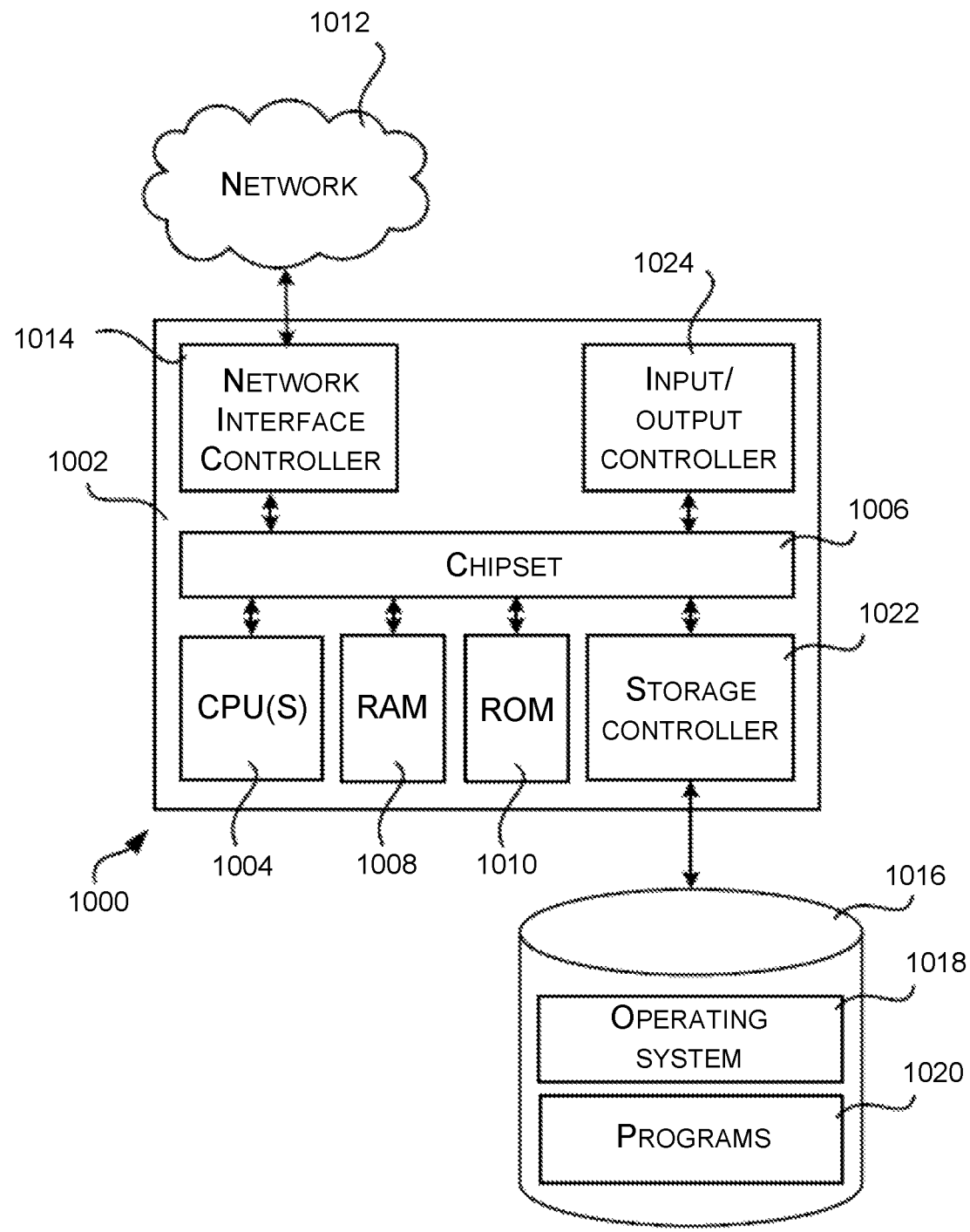
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A network-based analytics system, comprising:
   one or more processors; and
   memory storing computer-executable instructions which, when executed by the one or more processors, cause the network-based analytics system to:
   identify, based on customer input received by the network-based analytics system, at least one data item of an incoming data stream;
   determine a data bucket identifier (ID) of a data bucket associated with a current data bucket time window;
   associate the data bucket ID with the at least one data item based on receiving the at least one data item during the current data bucket time window;
   determine a partition count representing a number of partitions to be used during parallel processing of the incoming data stream to the data bucket;
   generate one or more data dividers based on the partition count, the one or more data dividers including a partition ID and a data bucket ID;
   store the one or more data dividers and the at least one data item in a database;
   determine, via a lambda function of the network-based analytics system, a randomly selected partition to assign to the at least one data item based on determining that the at least one data item is not a data divider;
   cause, based on the randomly selected partition, the at least one data item and the one or more data dividers to be ordered such that the one or more data dividers are processed after the at least one data item and additional data items received during the current data bucket time window; and determine that the data bucket is complete based on processing the one or more data dividers.

2. The network-based analytics system of claim 1, wherein the data bucket comprises a first data bucket, the memory further being executed by the one or more processors to cause the network-based analytics system to:

generate multiple data dividers based on the partition count and during the current data bucket time window;

assign respective partition IDs to each of the multiple data dividers;

assign the data bucket ID to each of the multiple data dividers;

cause the additional data items and each of multiple data dividers to be ordered via multiple partitions based on the respective partition IDs such that the multiple data dividers are processed after the additional data items;

determine that all of the multiple data dividers have been processed;

determine that the data bucket is complete based on determining that all of the multiple data dividers have been processed; and update a data bucket status associated with the data bucket, the data bucket status indicating that the data bucket is complete.

3. The network-based analytics system of claim 1, wherein the data bucket comprises a first data bucket, the memory further being executed by the one or more processors to cause the network-based analytics system to rotate processing of the incoming data stream to a second data bucket in response to determining that the first data bucket is complete.

4. The network-based analytics system of claim 1, wherein processing the one or more data dividers includes processing the randomly selected partition within a shard.

5. The network-based analytics system of claim 1, wherein the data bucket ID and a partition number associated with the randomly selected partition comprise a partition key associated with the at least one data item.

6. A computer-implemented method, comprising:

determining a data bucket identifier (ID) of a data bucket associated with a current data bucket time window;

associating the data bucket ID with multiple data items included within an incoming data stream based at least in part on receiving the multiple data items during the current data bucket time window;

generating multiple data dividers based at least in part on a number of partitions to be used during processing of the multiple data items to the data bucket;

causing the multiple data dividers and the multiple data items to be ordered into multiple partitions such that the multiple data dividers are processed after the multiple data items;

processing the multiple partitions;

determining that the data bucket is complete based at least in part on determining that all of the multiple data dividers have been processed; and updating a data bucket status associated with the data bucket, the data bucket status indicating that the data bucket is complete.

7. The computer-implemented method of claim 6, further comprising determining a randomly selected partition to assign to at least one data item of the multiple data items based at least in part on determining that the at least one data item is not a data divider.

8. The computer-implemented method of claim 6, wherein the multiple data items are received in response to receiving at least one customer input.

9. The computer-implemented method of claim 6, further comprising storing the multiple data items and the multiple data dividers in an audit log table prior to processing the multiple partitions.

10. The computer-implemented method of claim 6, further comprising inserting, via an application programming interface (API), individual data dividers of the multiple data dividers at an end processing side of individual partitions of the multiple partitions such that the individual data dividers are processed after individual data items within the individual partitions.

11. The computer-implemented method of claim 6, wherein the data bucket comprises a first data bucket, the method further comprising rotating processing of the incoming data stream to a second data bucket in response to determining that the first data bucket is complete.

12. The computer-implemented method of claim 6, wherein causing the multiple data dividers and the multiple data items to be ordered into the multiple partitions such that the multiple data dividers are processed after the multiple data items includes processing the multiple partitions within multiple shards.

13. The computer-implemented method of claim 12, wherein the incoming data stream is associated with at least one of web service data, microservice data, log data, application data, transaction data, financial data, or sensor data.

14. One or more non-transitory computer-readable media storing computer-executable instructions that, when executed by one or more processors of a network-based analytics system, cause the network-based analytics system to:

determine a data bucket identifier (ID) of a data bucket associated with a current data bucket time window;

associate the data bucket ID with multiple data items included within an incoming data stream based at least in part on receiving the multiple data items during the current data bucket time window;

generate multiple data dividers based at least in part on a number of partitions to be used during processing of the multiple data items to the data bucket;

cause the multiple data items and the multiple data dividers to be ordered into multiple partitions such that the multiple data dividers are processed after the multiple data items; and determine that the data bucket is complete based at least in part on determining that all of the multiple data dividers have been processed.

15. The one or more non-transitory computer-readable media of claim 14, wherein the computer-executable instructions, when executed by the one or more processors of the network-based analytics system, further cause the network-based analytics system to determine a randomly selected partition to assign at least one data item based at least in part on determining that the at least one data item is not a data divider.

16. The one or more non-transitory computer-readable media of claim 14, wherein the multiple data items comprise the incoming data stream and are received via at least one customer input.

17. The one or more non-transitory computer-readable media of claim 16, wherein the computer-executable instructions, when executed by the one or more processors of the network-based analytics system, further cause the network-based analytics system to store the multiple data items and the multiple data dividers in an audit log table prior to causing the multiple data items and the multiple data dividers to be ordered into the multiple partitions.

18. The one or more non-transitory computer-readable media of claim 14, wherein the computer-executable instructions, when executed by the one or more processors of the network-based analytics system, further cause the network-based analytics system to insert, via an application programming interface (API), individual data dividers of the multiple data dividers at an end processing side of individual partitions of the multiple partitions such that the individual data dividers are processed after individual data items within the individual partitions.

19. The one or more non-transitory computer-readable media of claim 14, wherein the data bucket comprises a first data bucket, the computer-executable instructions, when executed by the one or more processors of the network-based analytics system, further cause rotating processing of the incoming data stream to a second data bucket in response to determining that the first data bucket is complete.

20. The one or more non-transitory computer-readable media of claim 14, wherein the computer-executable instructions, when executed by the one or more processors of the network-based analytics system, further cause processing the multiple partitions within at least one shard.

\* \* \* \* \*